US012804398B2

(12) United States Patent
Raman et al.

(10) Patent No.: US 12,804,398 B2
(45) Date of Patent: Nov. 17, 2026

(54) CLOUD BASED AUTO-PROVISIONING OF WIRELESS SENSORS IN MULTI-TENANT DEPLOYMENTS

(71) Applicant: Nile Global, Inc., San Jose, CA (US)

(72) Inventors: Gopal Raman, San Jose, CA (US); Avinash Kumar, San Ramon, CA (US); Dipen Vardhe, San Jose, CA (US)

(73) Assignee: Nile Global, Inc., San Jose, CA (US)

( * ) Notice: Subject to any disclaimer, the term of this patent is extended or adjusted under 35 U.S.C. 154(b) by 82 days.

(21) Appl. No.: 18/917,290

(22) Filed: Oct. 16, 2024

(65) Prior Publication Data

US 2026/0107143 A1 Apr. 16, 2026

(51) Int. Cl.
*H04W 12/069* (2021.01)
*H04L 67/10* (2022.01)

(52) U.S. Cl.
CPC ........... *H04W 12/069* (2021.01); *H04L 67/10* (2013.01)

(58) Field of Classification Search
CPC ............................ H04W 12/069; H04L 67/10
See application file for complete search history.

(56) References Cited

U.S. PATENT DOCUMENTS 10,606,224 B2 * 3/2020 Rumble ............... G06Q 20/127
11,381,402 B2 * 7/2022 Hergesheimer ....... H04L 63/166
11,399,283 B2 7/2022 Swaminathan et al.
2008/0195741 A1 8/2008 Wynn et al.
2010/0179391 A1 7/2010 Quintanar, II et al.
2014/0029512 A1 1/2014 Chu et al.
2014/0115003 A1 4/2014 Paymal et al.
2014/0201529 A1 * 7/2014 Ma ...................... H04W 12/041 713/168
2015/0256391 A1 * 9/2015 Hardy ................ H04L 41/5054 709/222
2018/0013738 A1 * 1/2018 Yoo ........................ H04L 63/10
2018/0109377 A1 4/2018 Fu (Continued)

OTHER PUBLICATIONS

Granlund, Daniel et al., "EAP-Swift: An Efficient Authentication and Key Generation Mechanism for Resource Constrained WSNs", Hindawi Publishing Corporation; International Journal of Distributed Sensor Networks; vol. 2015; http://dx.doi.org/10.1155/2015/460914; 12 pages.

(Continued)

*Primary Examiner* — Mohamed Barakat
(74) *Attorney, Agent, or Firm* — Mark A. Wilson; LOZA & LOZA, LLP

(57) ABSTRACT

Embodiments of a device and method are disclosed. In an embodiment, a method of communications involves at a cloud authentication server, receiving an authentication request of a wireless sensor deployed at a customer site through a wireless access point (AP) to which the wireless sensor is associated, where the authentication request contains a certificate that is stored in the wireless sensor, at the cloud authentication server, performing an authentication operation to determine whether a tenant corresponding to the certificate matches a tenant corresponding to the wireless AP to which the wireless sensor is associated, and at the cloud authentication server, transmitting an authentication response to the wireless sensor through the wireless AP in response to the authentication operation.

20 Claims, 15 Drawing Sheets

(56) References Cited

U.S. PATENT DOCUMENTS

| | | | | |
|---|---|---|---|---|
| 2018/0270612 | A1* | 9/2018 | Thoresen | G01S 1/02 |
| 2019/0075459 | A1* | 3/2019 | Bicket | H04L 63/0823 |
| 2020/0077265 | A1* | 3/2020 | Singh | H04L 63/0272 |
| 2021/0058388 | A1 | 2/2021 | Knotwell et al. | |
| 2021/0297409 | A1 | 9/2021 | Rahn et al. | |
| 2025/0119739 | A1 | 4/2025 | Baranowsky | |

OTHER PUBLICATIONS

Corresponding U.S. Appl. No. 18/917,151. Office Action (Oct. 14, 2026).

* cited by examiner

CLOUD BASED AUTO-PROVISIONING OF WIRELESS SENSORS IN MULTI-TENANT DEPLOYMENTS

CROSS-REFERENCE TO RELATED APPLICATION

This application is related to co-pending U.S. patent application Ser. No. 18/917,151, filed Oct. 16, 2024, entitled AUTO-PROVISIONING OF WIRELESS SENSORS IN MULTI-TENANT DEPLOYMENTS.

BACKGROUND

A wireless (e.g., WiFi) vendor or service provider can deploy wireless (e.g., WiFi) sensors to monitor the health of the service provided and to measure service quality. For example, a wireless sensor may function as a wireless (e.g., WiFi) client to one or more Access Points (APs) and probe a wireless network periodically to implement different network services to ensure that the network services are functioning. Typically, a wireless sensor has to be provisioned ahead of deployment of a target network in order to provide the wireless sensor with information (e.g., one or more network names (e.g., service set identifiers (SSIDs)) or credentials, such as, pre-shared keys, anchor certificates, usernames, and/or password pairs) to connect and authenticate with the target network that the wireless sensor is supposed to monitor. Provisioning of wireless sensors is typically performed manually by an administrator, which can be cumbersome, time consuming, and error prone.

SUMMARY

Embodiments of a device and method are disclosed. In an embodiment, a method of communications involves at a cloud authentication server, receiving an authentication request of a wireless sensor deployed at a customer site through a wireless access point (AP) to which the wireless sensor is associated, where the authentication request contains a certificate that is stored in the wireless sensor, at the cloud authentication server, performing an authentication operation to determine whether a tenant corresponding to the certificate matches a tenant corresponding to the wireless AP to which the wireless sensor is associated, and at the cloud authentication server, transmitting an authentication response to the wireless sensor through the wireless AP in response to the authentication operation. Other embodiments are also described.

In an embodiment, at the cloud authentication server, performing the authentication operation includes at the cloud authentication server, searching a cloud authentication database (DB) for a database entry that includes the tenant corresponding to the certificate.

In an embodiment, at the cloud authentication server, performing the authentication operation further includes at the cloud authentication server, accepting the authentication request when the tenant corresponding to the certificate matches the tenant of the wireless AP that the wireless sensor is connected to, and the authentication response includes an authentication acceptance response.

In an embodiment, at the cloud authentication server, performing the authentication operation further includes at the cloud authentication server, rejecting the authentication request when the tenant corresponding to the certificate is different from the tenant of the wireless AP that the wireless sensor is connected to, and the authentication response includes an Extensible Authentication Protocol (EAP) notification response.

In an embodiment, the authentication rejection response includes an identifier of a tenant that the wireless sensor belongs to, and at the wireless sensor, the identifier of the tenant that the wireless sensor belongs to is extracted from the EAP notification response and written into a non-volatile storage of the wireless sensor.

In an embodiment, the method further includes at the wireless sensor, only associating with a second wireless AP that advertises the identifier in a beacon.

In an embodiment, the wireless AP has a service set identifier (SSID) known to the wireless sensor.

In an embodiment, the certificate is stored in a secured storage of the wireless sensor.

In an embodiment, the cloud authentication server includes one or more computing devices.

In an embodiment, the cloud authentication server includes one or more servers deployed remotely to the customer site.

In an embodiment, the certificate includes a sensor serial number of the wireless sensor.

In an embodiment, the wireless sensor is plugged in a power outlet at the customer site for monitoring a health of a wireless service, and the wireless sensor does not have a user interface.

In an embodiment, the method further includes using the wireless sensor, periodically probing a wireless network to which the wireless AP belongs to implement different network services.

In an embodiment, the authentication request includes an Extensible Authentication Protocol (EAP) message.

In an embodiment, at a head end (HE) connected between the wireless AP and the cloud authentication server, a payload is extracted from the authentication request and the payload is encapsulated into a Remote Authentication Dial-In User Service (RADIUS) message that is transmitted to the cloud authentication server.

In an embodiment, the cloud authentication server is deployed remotely to the customer site.

In an embodiment, a cloud authentication server includes a cloud authentication database (DB) configured to store database entries and one or more processors configured to receive an authentication request of a wireless sensor deployed at a customer site through a wireless access point (AP) to which the wireless sensor is associated, where the authentication request contains a certificate that is stored in the wireless sensor, perform an authentication operation to determine whether a tenant corresponding to the certificate matches a tenant corresponding to the wireless AP to which the wireless sensor is associated by searching the database entries of the cloud authentication DB, and generate an authentication response to the wireless sensor in response to the authentication operation.

In an embodiment, the one or more processors are further configured to accept the authentication request when the tenant corresponding to the certificate matches the tenant of the wireless AP that the wireless sensor is connected to, and the authentication response includes an authentication acceptance response.

In an embodiment, the one or more processors are further configured to reject the authentication request when the tenant corresponding to the certificate is different from the tenant of the wireless AP that the wireless sensor is connected to, and the authentication response includes an Extensible Authentication Protocol (EAP) notification response.

In an embodiment, a method of communications involves at a cloud authentication server, receiving a Remote Authentication Dial-In User Service (RADIUS) request of a wireless sensor deployed at a customer site through a wireless access point (AP) to which the wireless sensor is associated, the RADIUS request contains a certificate that is stored in the wireless sensor, at the cloud authentication server, performing an authentication operation to determine whether a tenant corresponding to the certificate matches a tenant corresponding to the wireless AP to which the wireless sensor is associated, and at the cloud authentication server, transmitting a RADIUS response to the wireless sensor through the wireless AP in response to the authentication operation.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
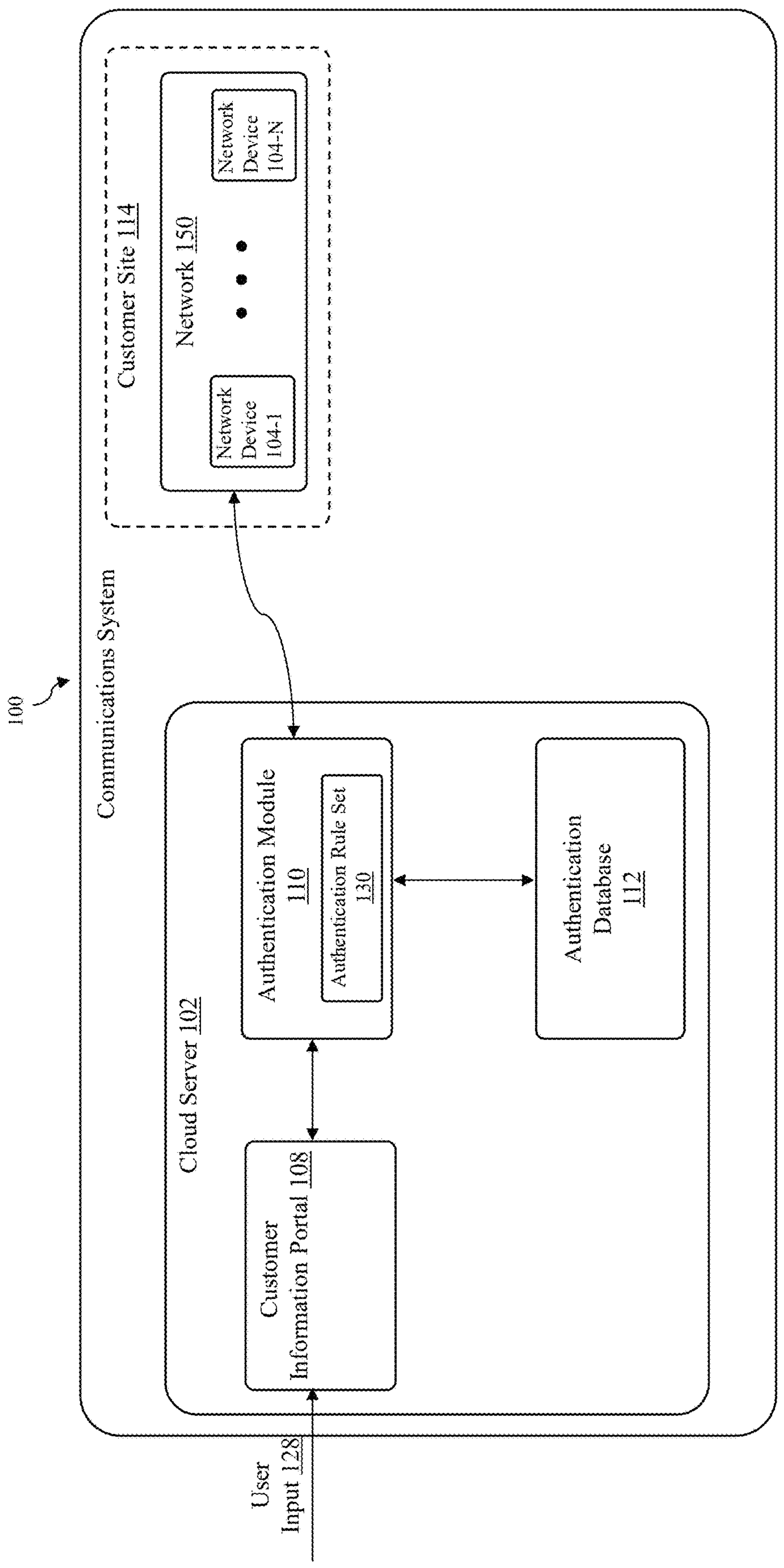
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and a deployed network 150 within a customer site 114. The cloud server and/or the network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a security service (e.g., an authentication service) to network devices (e.g., the deployed network 150) at the customer site. Because the cloud server can facilitate or perform a security service to network devices at the customer site, network security can be improved. In addition, because the cloud server can facilitate or perform a security service to network devices at the customer site, a user or customer of the customer site can be notified of security issues. In some embodiments, the cloud server is configured to generate a user interface to obtain user input information regarding network security in a floor plan of a customer site. In some embodiments, the user interface includes a graphical user interface. The cloud server may be implemented in hardware (e.g., circuits), software, firmware, or a combination thereof. In some embodiments, the cloud server is implemented on a server grade hardware platform, such as an x86 architecture platform. For example, the hardware platform of the cloud server may include components of a computing device, such as one or more processors (e.g., CPUs), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes an authentication module 110, a customer information portal 108 connected to the authentication module 110, and an authentication database 112 configured to store authentication data. The authentication module, the customer information portal, and/or the authentication database may be implemented in hardware (e.g., circuits), software, firmware, or a combination thereof. In some embodiments, the cloud server 102 is a Remote Authentication Dial-In User Service (RADIUS) server. Although the illustrated cloud server is shown with certain components and described with certain functionality herein, other embodiments of the cloud server may include fewer or more components to implement the same, less, or more functionality. For example, in some embodiments, the cloud server includes more than one authentication module, more than one customer information portal, and/or more than one authentication database. In another example, although the authentication module, the customer information portal, and the authentication database are shown in FIG. 1 as being connected in certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the server. In some embodiments, the authentication module 110 is configured to facilitate or perform an authentication service to network devices (e.g., the deployed network 150) at the customer site 114, for example, using an authentication rule set 130. The authentication rule set 130 may include one or more authentication rules for network devices at the customer site 114, for example, for performing an authentication service to network devices at the customer site 114. In some embodiments, the authentication database 112 is configured to store authentication data for a network deployed and/or to be deployed at the customer site (e.g., a list of network devices deployed or to be deployed at the customer site). Because the authentication module can facilitate or perform an authentication service to network devices at the customer site, network security can be improved. In addition, because the authentication module can facilitate or perform an authentication service to network devices at the customer site, a user or customer (e.g., a layperson such as a worker on-site or an end-user such as an employee) at the customer site can be notified of authentication issues. The customer information portal 108 is configured to receive customer input 128. In some embodiments, the customer information portal is configured to include or generate a user interface that allows a customer to input information associated with an authentication service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a central processing unit (CPU)), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N may be compatible with Institute of Electrical and Electronics Engineers (IEEE) 802.3 protocol and/or one or more wireless local area network (WLAN) communications protocols, such as IEEE 802.11 protocol. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one authentication server, at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N is a wireless station (STA) that wirelessly connects to a wireless AP. For example, at least one of the one or more network devices 104-1, . . . , 104-N may be a wireless sensor, a laptop, a desktop personal computer (PC), a mobile phone, or other wireless device that supports at least one WLAN communications protocol (e.g., an IEEE 802.11 protocol).

Figure 2:
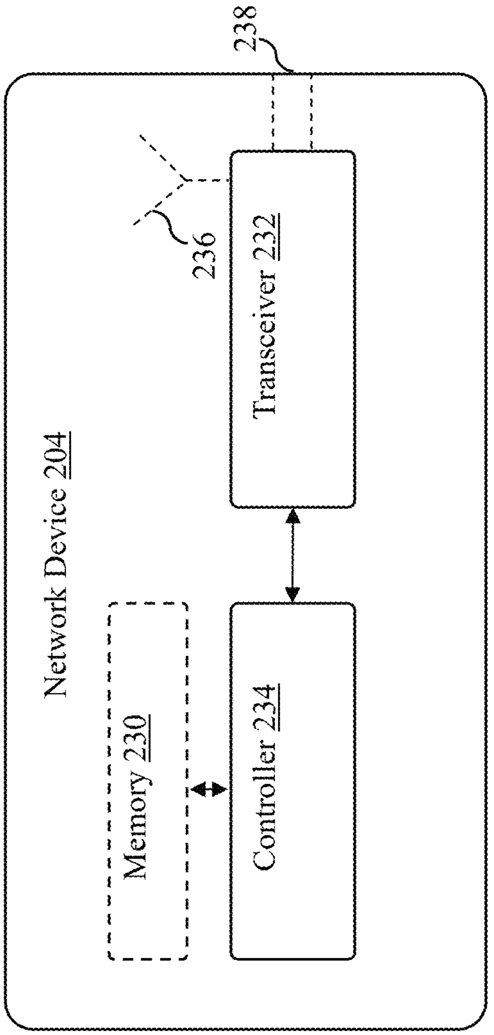
FIG. 2 depicts an embodiment of a network device of the communications system depicted in FIG. 1.

FIG. 2 depicts an embodiment of a network device 204 of the communications system depicted in FIG. 1. The network device 204 may be an embodiment of a network device that is included in the deployed network 150 depicted in FIG. 1. However, network devices that can be included in the deployed network 150 depicted in FIG. 1 are not limited to the embodiment depicted in FIG. 2. The network device 204 may be any suitable type of network device. For example, the network device 204 may be an authentication server, a head end (HE) or gateway, a wireless access point, or a sensor, described in details with reference to FIG. 2. In the embodiment depicted in FIG. 2, a network device 204 includes a wireless and/or wired transceiver 232, a controller 234 operably connected to the transceiver 232, at least one optional antenna 236 operably connected to the transceiver 232, and at least one optional network port 238 operably connected to the transceiver 232. In some embodiments, the transceiver 232 includes a physical layer (PHY) device. The transceiver 232 may be any suitable type of transceiver. For example, the transceiver 232 may be a short-range communications transceiver (e.g., a Bluetooth) or a WLAN transceiver (e.g., a transceiver compatible with an IEEE 802.11 protocol). In some embodiments, the network device 204 includes multiple transceivers, for example, a short-range communications transceiver (e.g., a Bluetooth) and a WLAN transceiver (e.g., a transceiver compatible with an IEEE 802.11 protocol). In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to perform an authentication function for the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a DS, a HE or gateway, an AS, a wireless AP, or a wireless sensor that wirelessly connects to a wireless AP. In some embodiments, the network device 204 includes memory 230, which may be a standalone unit or embedded into another component (e.g., the controller 234) of the network device 204. In some embodiments, the memory is volatile memory used for retrieving programs and processing data. The memory may include, for example, one or more random access memory (RAM) modules. Although the illustrated network device 204 is shown with certain components and described with certain functionality herein, other embodiments of the network device 204 may include fewer or more components to implement the same, less, or more functionality. In another example, although the components of the network device 204 are shown in FIG. 2 as being connected in certain topology, the network topology of the network device 204 is not limited to the topology shown in FIG. 2.

In some embodiments, the network device 204 operates according to EAP-TLS (Extensible Authentication Protocol-Transport Layer Security). In EAP-TLS, a client and an authentication server (AS) (e.g., a Radius server) are provisioned with certificates. In some embodiments, each certificate has an associated public and private key. For example, the client certificate carries the public key of the client, and the server certificate has the public key of the AS. These certificates are typically signed by an authority that can be verified by both the client and the AS. For example, the TLS protocol (Request For Comments (RFC) 5246) defines a message exchange protocol that allows certificate based authentication between a client and a server. EAP defines a message format that allows TLS protocol messages to be encapsulated and transmitted between a client and an AS.

In some embodiments, the network device 204 includes one or more processors (e.g., the controller 234) configured to associate with a wireless access point (AP) using a fixed service set identifier (SSID) and a wireless transceiver (e.g., the transceiver 232) configured to transmit an authentication request to an authentication server through the wireless AP and to receive an authentication response from the authentication server through the wireless AP in response to the authentication request, where the authentication request contains a certificate that is stored in the network device 204. In some embodiments, a tenant database (DB) is searched by the authentication server for a tenant corresponding to the certificate. In some embodiments, when the tenant corresponding to the certificate matches a tenant of the wireless AP that the network device 204 is connected to, the authentication request is accepted by the authentication server, and the authentication response includes an authentication acceptance response. In some embodiments, when the tenant corresponding to the certificate is different from a tenant of the wireless AP that the network device 204 is connected to, the authentication request is rejected by the authentication server, and the authentication response includes an authentication rejection response. In some embodiments, the one or more processors (e.g., the controller 234) are further configured to extract an identifier of a tenant that the network device 204 belongs to from the authentication response and to write the identifier into a non-volatile storage. In some embodiments, the one or more processors (e.g., the controller 234) are further configured to only associate with a second wireless AP that advertises the identifier in a beacon. In some embodiments, the certificate is stored in a secured storage of the network device 204. In some embodiments, the secured storage of the network device 204 includes a Trusted Platform Module (TPM) of the network device 204. In some embodiments, the secured storage of the network device 204 includes a hardware security module (HSM) of the network device 204. In some embodiments, the network device 204 includes a wireless sensor for monitoring a health of a wireless service. In some embodiments, the certificate includes a sensor serial number of the wireless sensor. In some embodiments, the wireless sensor is used to periodically probe a wireless network to which the wireless AP belongs to implement different network services. In some embodiments, the authentication request includes an Extensible Authentication Protocol (EAP) message. In some embodiments, at a head end (HE) connected between the wireless AP and the authentication server, a payload is extracted from the authentication request and the payload is encapsulated into a Remote Authentication Dial-In User Service (RADIUS) message that is transmitted to the authentication server. In some embodiments, the authentication server is deployed remotely to the customer site.

Figure 3:
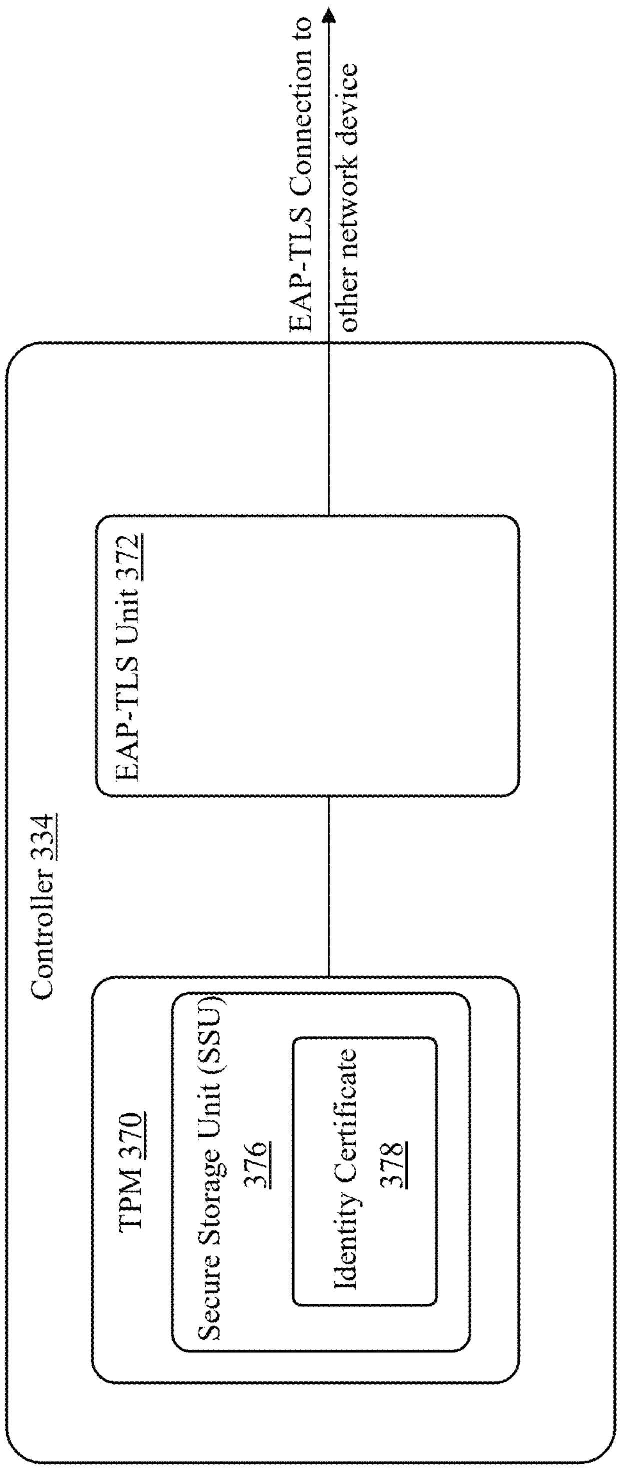
FIG. 3 depicts an embodiment of a controller of the network device depicted in FIG. 2.

FIG. 3 depicts a controller 334, which is an embodiment of the controller 234 of the network device 204 depicted in FIG. 2. The controller 334 depicted in FIG. 3 is one possible embodiment of the controller 234 depicted in FIG. 2. However, the controller 234 depicted in FIG. 2 is not limited to the embodiment shown in FIG. 3. In the embodiment depicted in FIG. 3, the controller 334 includes a Trusted Platform Module (TPM) 370 and an Extensible Authentication Protocol—Transport Layer Security (EAP-TLS) unit 372 operably connected to the TPM 370.

In the embodiment depicted in FIG. 3, the TPM 370 includes a secure storage unit (SSU) 376 that is configured to store an identity certificate 378, which can be any type of encryption information and/or encryption keys. For example, the identity certificate 378 may be a Rivest-Shamir-Adleman (RSA) private key or another encryption private key. Because the identity certificate 378 is stored in the secure storage unit 376 of the TPM 370, external attacks become more difficult or even infeasible. In some embodiments, the TPM 370 is a tamper proof hardware (e.g., a tamper proof IC chip) that performs operations using the identity certificate 378 without revealing the identity certificate 378 to outside entities. In some embodiments, the TPM 370 includes a secure crypto processor configured to carry out cryptographic operations (e.g., generating, storing, and/or limiting the use of cryptographic keys) and/or multiple physical security mechanisms to make the TPM 370 tamper-resistant. Consequently, it is difficult or impossible for malicious software to tamper with the security functions of the TPM 370. In some embodiments, the TPM is replaced by or in addition to a hardware security module (HSM). In some embodiments, the identity certificate 378 stored in the TPM 370 of a network device is unique to the network device and is, for example, tied to the serial number and other unique identity of the network device, such as the Ethernet MAC address of the network device. Impersonating a network device typically requires an attacker to gain access the identity certificate 378. By storing the identity certificate 378 in the TPM 370, impersonation attacks become more difficult or even infeasible. In some embodiments, the controller 334 includes a cryptographic engine configured to generate a client signature based on the identity certificate 378.

In the embodiment depicted in FIG. 3, the EAP-TLS unit 372 interacts with the TPM 370 to perform EAP/TLS operations that require the identity certificate 378. In some embodiments, the EAP-TLS unit 372 is configured to, based on the identity certificate 378 stored in the TPM 370, establish a TLS connection to an authentication server (AS). Based on the established EAP-TLS session with the AS, the controller 334 of a network device may perform mutual authentication with the AS.

Figure 4:
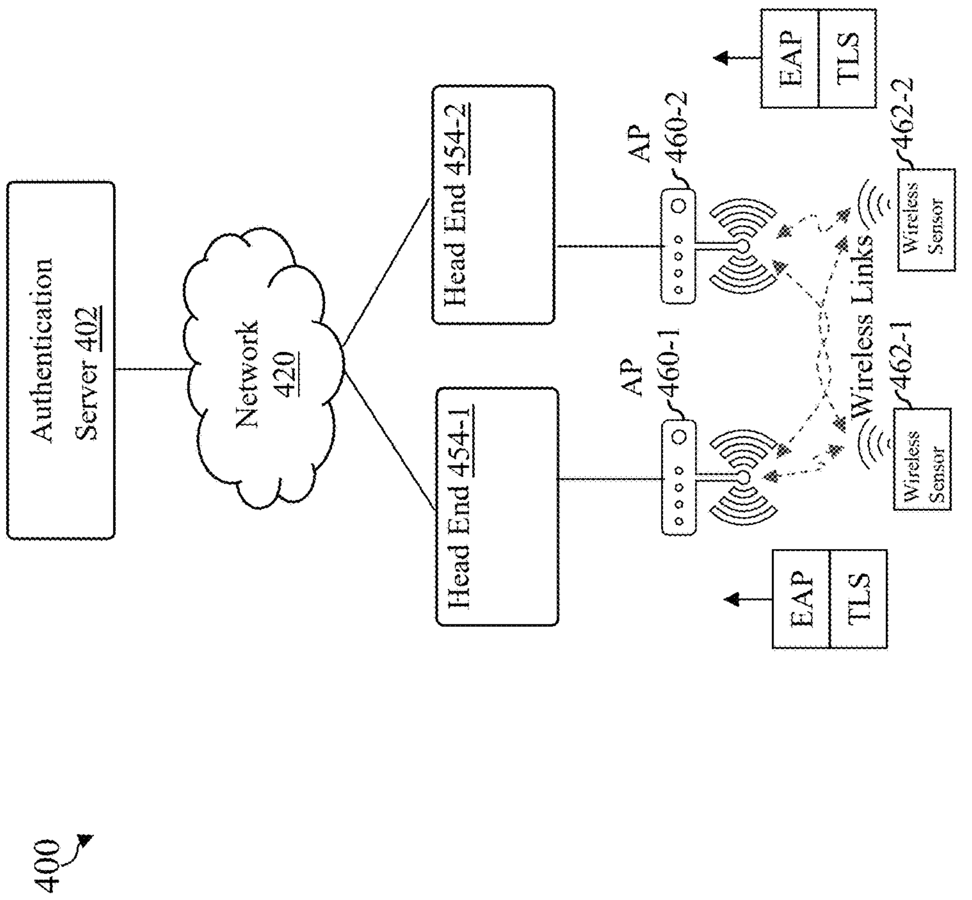
FIG. 4 depicts an embodiment of a communications system in accordance to an embodiment of the invention.

FIG. 4 depicts an embodiment of a communications system 400 in accordance to an embodiment of the invention. The communications system 400 depicted in FIG. 4 is one possible embodiment of the communications system 100 depicted in FIG. 1. However, the communications system 100 depicted in FIG. 1 is not limited to the embodiment shown in FIG. 4. In the embodiment depicted in FIG. 4, the communications system 400 includes an authentication server (e.g., a RADIUS server) 402, a network 420 (e.g., the Internet), two HEs or gateways 454-1, 454-2, two wireless APs 460-1, 460-2 connected to the HEs 454-1, 454-2, respectively, and two wireless sensors 462-1, 462-2 that wirelessly connect to the wireless APs. In some embodiments, one or more of the wireless sensors 462-1, 462-2 are replaced by or in addition to a laptop, a desktop PC, a mobile phone, or other wireless device that supports at least one wireless communications protocol (e.g., an IEEE 802.11 protocol). In some embodiments, instead of or in addition to the wireless sensors 462-1, 462-2 that wirelessly connect to the wireless APs, one or more wired clients are connected to the wireless APs through one or more cables or wires. In some embodiments, at least one of the authentication server 402, the HEs 454-1, 454-2, the wireless APs 460-1, 460-2, and the wireless sensors 462-1, 462-2 depicted in FIG. 4 is implemented as the network device 204 depicted in FIG. 2. In some embodiments, the authentication server 402 is configured to facilitate or perform an authentication service to the wireless sensors 462-1, 462-2, for example, using an authentication rule set, which may include one or more authentication rules. The authentication server 402 and/or the HEs 454-1, 454-2 may be located in the customer site 114 or remotely to the customer site 114 (e.g., in a remote data center). For example, the authentication server 402 may be implemented as the cloud server 102 depicted in FIG. 1. Although the illustrated communications system 400 is shown with certain components and described with certain functionality herein, other embodiments of the communications system 400 may include fewer or more components to implement the same, less, or more functionality. In another example, although the components of the communications system 400 are shown in FIG. 4 as being connected in certain topology, the network topology of the communications system 400 is not limited to the topology shown in FIG. 4.

In the embodiment depicted in FIG. 4, four different types of entities, which are the wireless sensors 462-1, 462-2, the wireless APs 460-1, 460-2, the HEs 454-1, 454-2, and the authentication server 402 participate in IEEE 802.1x authentication. The wireless sensors 462-1, 462-2 are the entities that need to be authenticated before being allowed to access the network. In the embodiment depicted in FIG. 4, the wireless sensors 462-1, 462-2 associate with the wireless APs 460-1, 460-2. Each wireless AP sends authentication messages received from one or more of the wireless sensors 462-1, 462-2 over a specific connection to the HEs 454-1, 454-2. For example, the wireless AP 460-2 sends authentication messages from the wireless sensor 462-1 to the HE 454-1 or 454-2, while the wireless AP 460-2 sends one or more authentication messages from the wireless sensor 462-2 to the HE 454-2 or 454-1. Any authentication responses to a client/sensor are also received by a corresponding wireless AP. For example, the wireless AP 460-1 receives authentication responses to the wireless sensor 462-1 and transmits response data to the wireless sensor 462-1, while the wireless AP 460-2 receives authentication responses to the wireless sensor 462-2 and transmits response data to the wireless sensor 462-2, or vice versa. The HEs 454-1, 454-2 act as a front end to the authentication server 402, which may be a RADIUS server. In some embodiments, the HEs 454-1, 454-2 maintain a client table, which can contain client data, e.g., a row for each client. In some embodiments, the HEs 454-1, 454-2 are configured to transmit at least one authentication request and to receive at least one authentication response. In the embodiment depicted in FIG. 4, the authentication (e.g., RADIUS) protocol related parts of the IEEE 802.1x authenticator function are implemented in the HEs 454-1, 454-2 (e.g., in a controller of the HEs 454-1, 454-2). The HEs 454-1, 454-2 function as a front end to the authentication server 402 (e.g., a RADIUS server) while retaining the IEEE 802.1x related authenticator functions in the corresponding wireless AP 460-1 or 460-2. In some embodiments, the authentication server 402 is a RADIUS server. In these embodiments, the HEs 454-1, 454-2 serve as a RADIUS front end and relays messages between a RADIUS server (the authentication server 322) and a corresponding wireless AP. In some embodiments, cryptographic security is implemented between the wireless AP 460-1 or 460-2 and the HEs 454-1, 454-2 to protect IEEE 802.1x messages in the end-to-end path. In some embodiments, at least one of the HEs 454-1, 454-2 includes a transceiver (not shown), which may be a wireless and/or wired transceiver, a controller (not shown) operably connected to the transceiver and including or storing a client table, and one or more network ports, which may be logical ports or physical ports, that can be operably connected to the transceiver. In some embodiments, the transceiver includes a PHY device. The transceiver may be any suitable type of transceiver. In some embodiments, the controller is configured to perform an authentication function for the wireless sensors 462-1, 462-2. The network ports may be any suitable type of port. For example, the network ports may be LAN network ports such as Ethernet ports.

However, the network ports are not limited to LAN network ports.

In the embodiment depicted in FIG. 4, the device provisioning step prior to deploying wireless sensors is eliminated, which means that the software that runs on a wireless sensor "out of the box" is able to perform two basic functions, identifying the network name of a wireless (e.g., WiFi) network to connect to and mutually authenticating the wireless (e.g., WiFi) network. Wireless (e.g., WiFi) networks may be identified by their SSIDs and each AP may advertise one or more SSIDs. To avoid inadvertent SSID name clashes of un-coordinated, co-located, multi-tenant deployments, SSIDs have to be chosen carefully. In a conventional approach, if two tenants A and B are co-located, a wireless sensor for tenant A is provisioned with the SSID and associated authentication credentials of tenant A. However, manual provisioning is cumbersome, error prone, and time consuming and can pose a security risk. Another problem is that the configuration for the SSID of a wireless sensor that is sent to a corresponding AP from a cloud configuration service must exactly match what has been provisioned on the wireless sensor. Otherwise, the wireless sensor will not be able to join the wireless network. Because the SSID of a wireless sensor is configured and operated by a vendor or service provider (VoSP) rather than an end consumer, the VoSP is obligated to use the highest grade network security possible to prevent attacks on a customer network via the sensor SSID. Existing solutions that provision a wireless sensor prior to the network deployment typically use weak authentication modes such as Pre Shared Key (PSK). For example, the PSK is the same for all wireless sensors and is stored in non-volatile storage of all wireless sensors. Because wireless sensors are usually not physically secured, a bad actor can steal the PSK and use that stolen PSK to pose or masquerade as a legitimate device. Some vendors use certificate based authentication, but may need a username and password to be stored on the wireless sensor. In the embodiment depicted in FIG. 4, the communications system 400 eliminates the manual provisioning step altogether and yet has the ability for the wireless sensors 462-1, 462-2 to learn to connect to the intended network using the strongest mutual authentication mechanisms available, which becomes necessary when the wireless sensor is in the proximity of different APs belonging to multiple tenants.

In the embodiment depicted in FIG. 4, the authentication server 402 includes a Cloud Tenant Database (DB) (e.g., the authentication database 112 depicted in FIG. 1). In some embodiments, the Cloud Tenant Database (DB) is a service that maintains a database of tenants and for each tenant it has the serial numbers of the wireless sensors (and other network devices such as APs) that belong to each tenant. There may also be a unique network service ID (e.g., a network service block (NSB) ID), typically 32 bits associated with each tenant. In some embodiments, the authentication server 402 is a cloud service that implements a Radius or similar authentication protocol to authenticate wireless sensors. In some embodiments, an AP is a device that is deployed at a site or geographical location and provides a wireless (e.g., WiFi) service to clients. In some embodiments, the AP belongs to exactly one tenant and should provide service only to clients authorized by the tenant. In some embodiments, a wireless sensor is a wireless (e.g., WiFi) client device that belongs to exactly one tenant. In some embodiments, the function of a sensor is to check the tenant's service health and quality. Typically the wireless sensor connects to an AP that it can hear and runs tests/experiments to check for errors or failures and measure performance metrics such as throughput and latency. The authentication steps can take place on multiple different servers in the cloud. In some embodiments, the authentication server includes one or more computing devices. In some embodiments, the authentication server includes one or more servers deployed remotely to a customer site.

Figure 5:
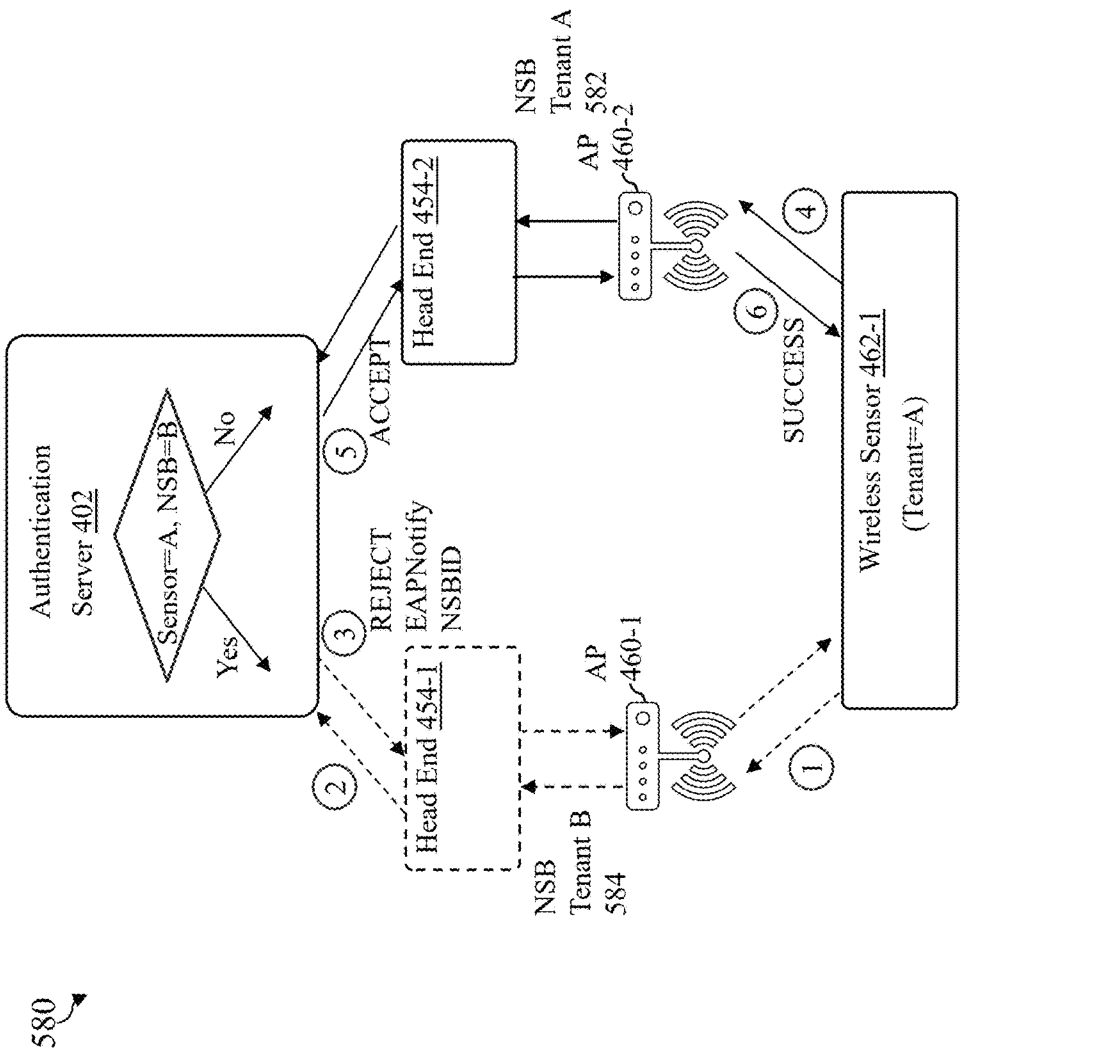
FIG. 5 illustrates an example operation of the communications system depicted in FIG. 4.

FIG. 5 illustrates an example operation 580 of the communications system 400 depicted in FIG. 4. In the example operation 580 illustrated in FIG. 5, each of the HEs 454-1, 454-2 operates as an authenticator according to EAP-TLS and two tenants A and B 582, 584 are co-located with the wireless sensor 462-1 belonging to tenant A 582. To avoid provisioning a per-tenant SSID on each sensor, a fixed SSID string is used for all sensors. This fixed SSID is known when developing the AP and sensor software. All APs, regardless of the tenants they belong to, advertise the same SSID and the SSID is also known to all sensors. While this avoids the need to provision each sensor with an SSID, the problem of co-located tenants needs to be solved because a sensor belonging to tenant A 582 should not connect to an AP of tenant B 584.

In the example operation 580 illustrated in FIG. 5, in a first step, when the wireless sensor 462-1 for tenant A 582 comes or boots up for the first time, the wireless sensor 462-1 associates to any AP that it can see (e.g., the AP 460-1 associated with tenant B 584) and initiates IEEE 802.1x authentication. In a second step, the wireless sensor 462-1 presents its certificate to a cloud AS (e.g., the authentication server 402) through the AP 460-1. The common name (CN) in the certificate may be the sensor serial number. The authentication server 402 may look up a Cloud Tenant Database (DB) (e.g., the authentication database 112 depicted in FIG. 1) for the tenant corresponding to the sensor serial number. If/when the tenant looked up for the wireless sensor 462-1 matches the tenant of the AP 460-1 that the wireless sensor 462-1 is connected or associated to, there is no mismatch and the wireless sensor 462-1 proceeds with authentication. In a third step, it is determined that the sensor

462-1 belongs to tenant A 582 and the AP 460-1 belongs to tenant B 584, the authentication server 402 rejects the authentication of the sensor 462-1 but sends it the network device identifier (NSID) of the tenant that the sensor 462-1 belongs to (i.e., tenant A 582) as part of an EAP notify payload. In a fourth step, once the sensor 462-1 extracts the NSID, the sensor 462-1 writes the NSID into its non-volatile storage and then only looks for APs that are advertising a matching NSID in their beacons. The wireless sensor 462-1 presents its certificate to a cloud AS (e.g., the authentication server 402) through the AP 460-2. The common name (CN) in the certificate may be the sensor serial number. The authentication server 402 may look up a Cloud Tenant Database (DB) (e.g., the authentication database 112 depicted in FIG. 1) for the tenant corresponding to the sensor serial number. In a fifth step, the tenant ID obtained from the DB look up for the wireless sensor 462-1 matches the tenant of the AP 460-2 that the wireless sensor 462-1 is associated to, the authentication server 402 accepts the authentication of the wireless sensor 462-1. In a sixth step, the wireless sensor 462-1 is successfully authenticated. Subsequently, the wireless sensor 462-1 monitors the health of wireless services provided and measures service quality. For example, the wireless sensor 462-1 probes the communications system 400 periodically to exercise or implement different network services to ensure that these network services are functioning.

In some embodiments, the wireless sensor 462-1 uses IEEE 802.1x with EAP-TLS and with a X.509 certificate burned into the wireless sensor at manufacturing time. The private key corresponding to this certificate may be stored in a TPM or similar HSM module on the wireless sensor 462-1. In some embodiments, the common name in the sensor certificate is its serial number. When the wireless sensor 462-1 presents its certificate to a cloud AS (e.g., the authentication server 402), the cloud AS can search or lookup the serial number in the certificate in a Cloud Tenant DB (e.g., the authentication database 112 depicted in FIG. 1) and determine the tenant that the wireless sensor 462-1 belongs to. From the tenant entry, the cloud AS can obtain the NSID for the tenant that this wireless sensor belongs to. The use of certificate based authentication with a tamper-proof TPM/HSM based private key makes it very difficult for a bad actor to alter the sensor serial number and can prevent or thwart a typical tenant matching scheme. The use of a fixed SSID across all tenants dramatically reduces the logistical complexity of deploying wireless sensors in multi-tenant situations and simplifies the backend network configuration that no longer needs to be customized per tenant, for example, by matching of the sensor serial number to the tenant in the cloud and using EAP notify to inform the wireless sensor about the NSID to look for in the beacons. The authentication steps can take place on multiple different servers in the cloud. In some embodiments, the authentication server includes one or more computing devices. In some embodiments, the authentication server includes one or more servers deployed remotely to a customer site.

Figure 6:
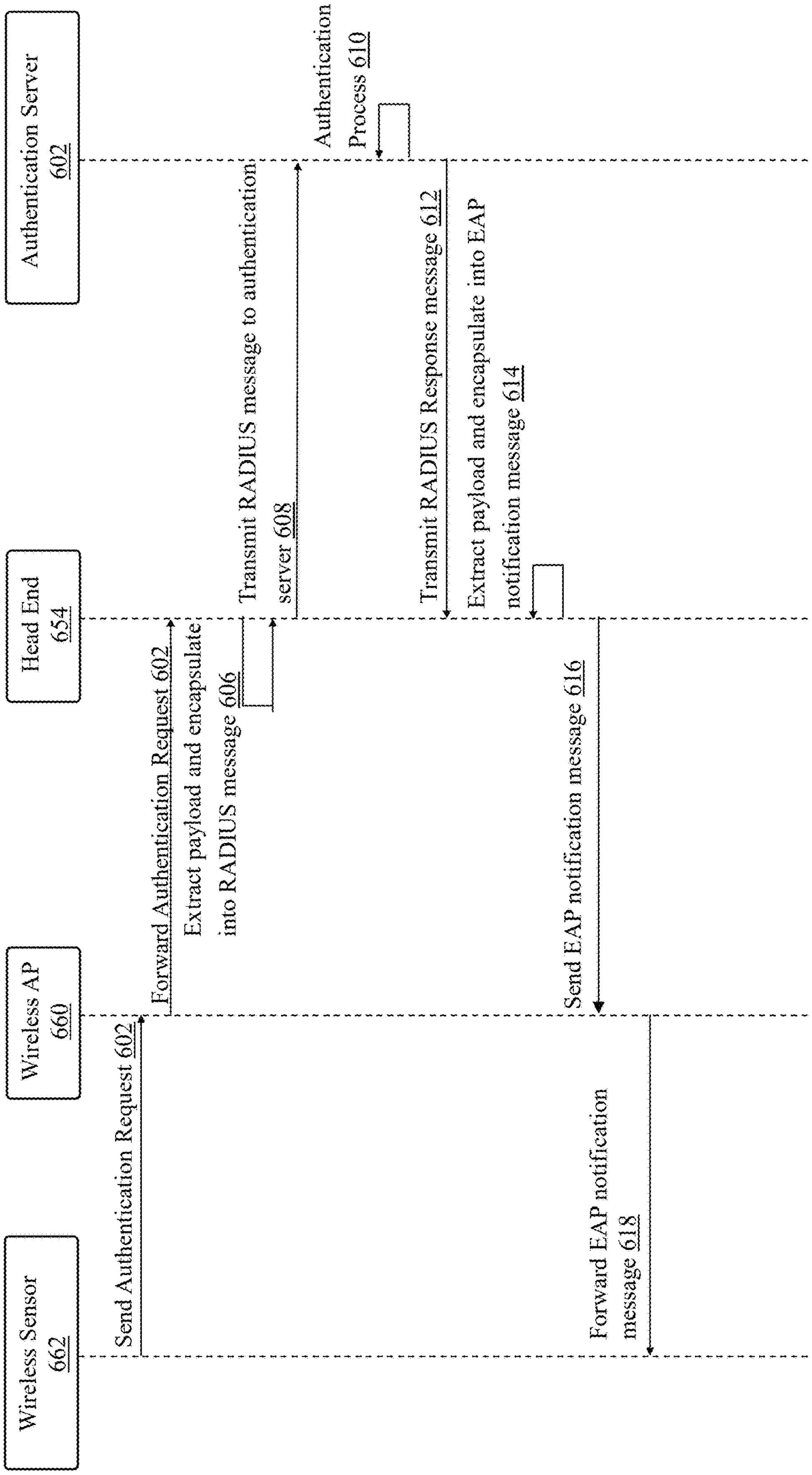
FIG. 6 shows a swim-lane diagram illustrating an example authentication procedure.

FIG. 6 shows a swim-lane diagram illustrating an example authentication procedure between a wireless sensor 662, a wireless AP 660, a HE 654, and an authentication server 602 (e.g., a RADIUS server). In the authentication procedure depicted in FIG. 6, the HE 654 may function as a front end to the authentication server 602 (e.g., a RADIUS server). The wireless device 662 depicted in FIG. 6 may be similar to, the same as, or a component of the network devices 104-1, . . . , 104-N depicted in FIG. 1, the network device 204 depicted in FIG. 2, and/or the wireless sensors 462-1, 462-2 depicted in FIGS. 4 and 5. The wireless AP 660 depicted in FIG. 6 may be similar to, the same as, or a component of the network devices 104-1, . . . , 104-N depicted in FIG. 1, the network device 204 depicted in FIG. 2, and/or the wireless APs 460-1, 460-2 depicted in FIGS. 4 and 5. The HE 654 depicted in FIG. 6 may be similar to, the same as, or a component of the HEs 454-1, 454-2 depicted in FIG. 4. The authentication server 602 depicted in FIG. 6 may be similar to, the same as, or a component of the cloud server 102 depicted in FIG. 1 and/or the authentication server 402 depicted in FIGS. 4 and 5. Although operations in the example procedure in FIG. 6 are described in a particular order, in some embodiments, the order of the operations in the example procedure may be altered so that certain operations may be performed in an inverse order or so that certain operations may be performed, at least in part, concurrently with other operations. The authentication steps can take place on multiple different servers in the cloud. In some embodiments, the authentication server includes one or more computing devices. In some embodiments, the authentication server includes one or more servers deployed remotely to a customer site.

In the swim-lane diagram depicted in FIG. 6, the wireless sensor 662 starts an authentication process by sending an authentication request to the wireless AP 660 in operation 602 and the wireless AP 660 forwards the authentication request to the HE 654 in operation 604. In operation 606, the HE 654 extracts a payload from the received authentication request and encapsulates the payload into a RADIUS message. In operation 608, the HE 654 sends the RADIUS message to the authentication server 602. In operation 610, the authentication server 602 performs an authentication process (e.g., searching a tenant database (DB) for a tenant corresponding to a certificate in the RADIUS message). In some embodiments, when the tenant corresponding to the certificate is different from a tenant of the wireless AP that the wireless device is connected to, the authentication request is rejected by the authentication server, and the authentication server 602 transmits an EAP notification message in a RADIUS response message to the HE 654 in operation 612. In operation 614, the HE 654 extracts the EAP notification payload from the received RADIUS response message and encapsulates the payload into an EAP notification message. In operation 616, the HE 654 sends the EAP notification message to the wireless AP 660, which forwards the received EAP notification message to the wireless sensor 662. In some embodiments, at the wireless sensor, an identifier of a tenant that the wireless sensor belongs to is extracted from the EAP notification message and the identifier is written into a non-volatile storage. In some embodiments, the wireless sensor is only associated with a second wireless AP that advertises the identifier in a beacon.

Figure 7:
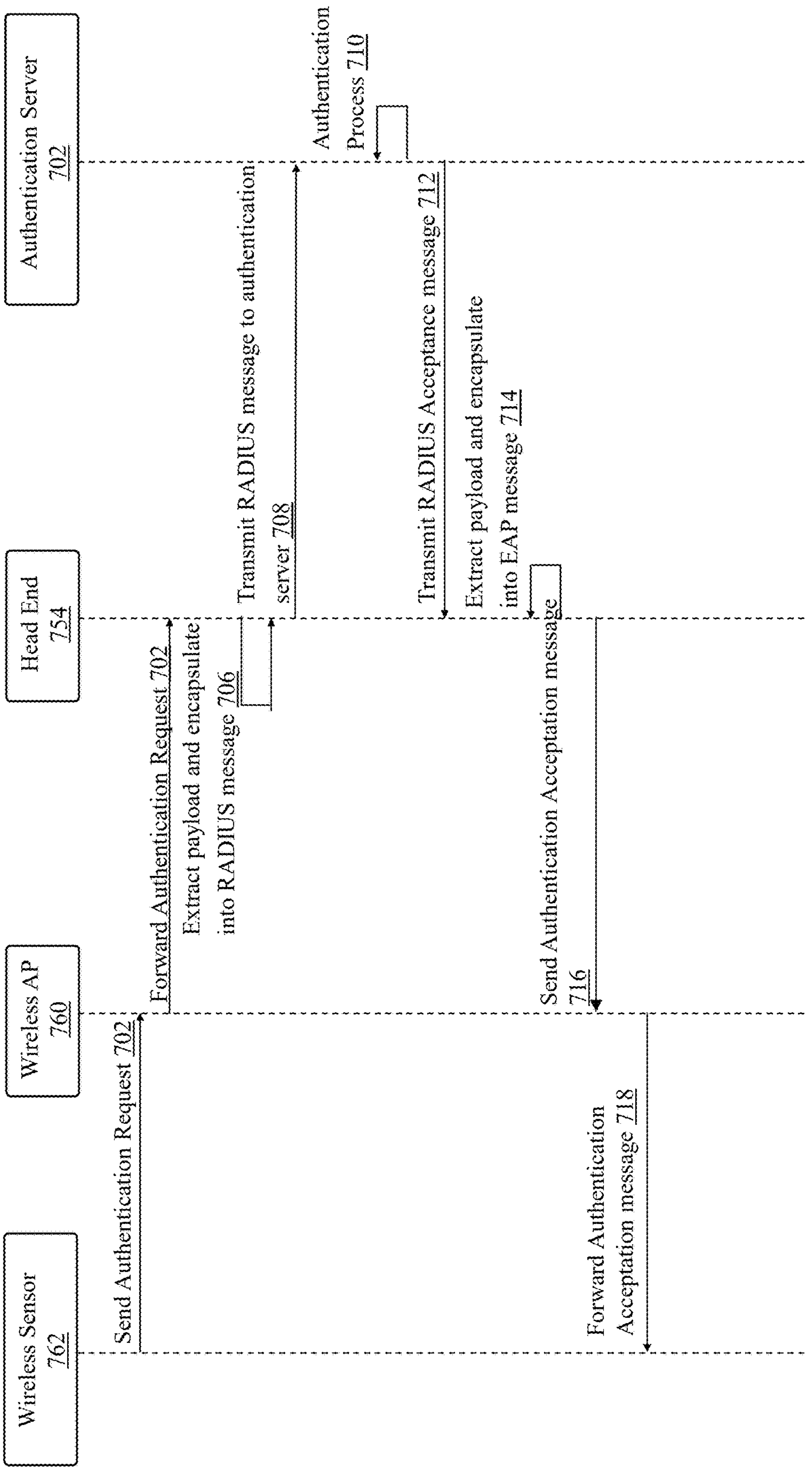
FIG. 7 shows a swim-lane diagram illustrating an example authentication procedure.

FIG. 7 shows a swim-lane diagram illustrating an example authentication procedure between a wireless sensor 762, a wireless AP 760, a HE 754, and an authentication server 702 (e.g., a RADIUS server). In the authentication procedure depicted in FIG. 7, the HE 754 may function as a front end to the authentication server 702 (e.g., a RADIUS server). The wireless device 762 depicted in FIG. 7 may be similar to, the same as, or a component of the network devices 104-1, . . . , 104-N depicted in FIG. 1, the network device 204 depicted in FIG. 2, the wireless sensors 462-1, 462-2 depicted in FIGS. 4 and 5, and/or the wireless sensor 662 depicted in FIG. 6. The wireless AP 760 depicted in FIG. 7 may be similar to, the same as, or a component of the network devices 104-1, . . . , 104-N depicted in FIG. 1, the network device 204 depicted in FIG. 2, the wireless APs 460-1, 460-2 depicted in FIGS. 4 and 5, and/or the wireless AP 660 depicted in FIG. 6. The HE 754 depicted in FIG. 7 may be similar to, the same as, or a component of the HEs 454-1, 454-2 depicted in FIG. 4 and/or the wireless sensor 654 depicted in FIG. 6. The authentication server 702 depicted in FIG. 7 may be similar to, the same as, or a component of the cloud server 102 depicted in FIG. 1, the authentication server 402 depicted in FIGS. 4 and 5, and/or the authentication server 702 depicted in FIG. 7. Although operations in the example procedure in FIG. 7 are described in a particular order, in some embodiments, the order of the operations in the example procedure may be altered so that certain operations may be performed in an inverse order or so that certain operations may be performed, at least in part, concurrently with other operations. The authentication steps can take place on multiple different servers in the cloud. In some embodiments, the authentication server includes one or more computing devices. In some embodiments, the authentication server includes one or more servers deployed remotely to a customer site.

In the swim-lane diagram depicted in FIG. 7, the wireless sensor 762 starts an authentication process by sending an authentication request to the wireless AP 760 in operation 702 and the wireless AP 760 forwards the authentication request to the HE 754 in operation 704. In operation 706, the HE 754 extracts a payload from the received authentication request and encapsulates the payload into a RADIUS message. In operation 708, the HE 754 sends the RADIUS message to the authentication server 702. In operation 710, the authentication server 702 performs an authentication process (e.g., searching a tenant database (DB) for a tenant corresponding to a certificate in the RADIUS message). In some embodiments, when the tenant corresponding to the certificate matches a tenant of the wireless AP that the wireless device is connected to, the authentication request is accepted by the authentication server, and the authentication server 702 transmits an authentication acceptance response (e.g., a RADIUS acceptance message) to the HE 754 in operation 712. In operation 714, the HE 754 extracts a payload from the received RADIUS acceptance message and encapsulates the payload into an EAP authentication acceptance message. In operation 716, the HE 754 sends the EAP authentication acceptance message to the wireless AP 760, which forwards the received EAP authentication acceptance message to the wireless sensor 762.

Figure 8:
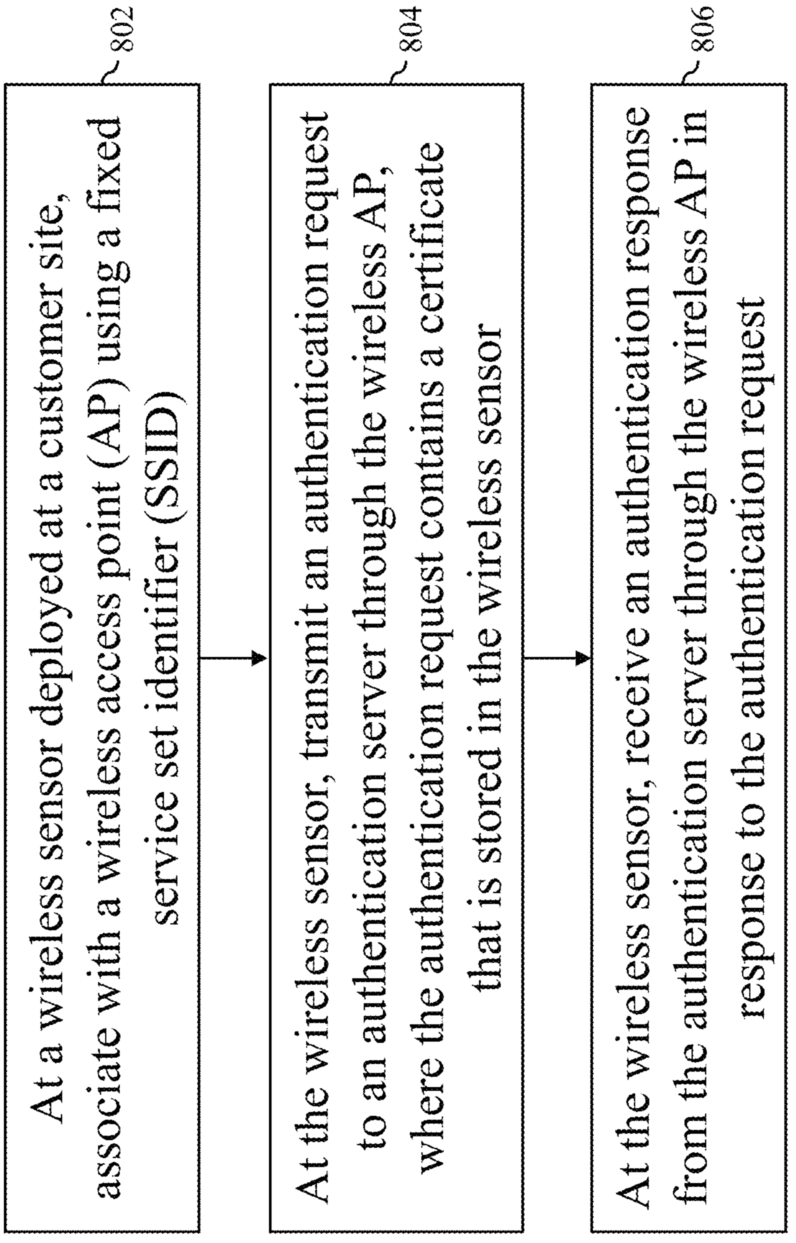
FIG. 8 is a process flow diagram of a method of communications in accordance to an embodiment of the invention.

FIG. 8 is a process flow diagram of a method of communications in accordance to an embodiment of the invention. According to the method, at block 802, at a wireless sensor deployed at a customer site, the wireless sensor is associated with a wireless access point (AP) using a fixed service set identifier (SSID). At block 804, at the wireless sensor, an authentication request is transmitted to an authentication server through the wireless AP, where the authentication request contains a certificate that is stored in the wireless sensor. At block 806, at the wireless sensor, an authentication response is received from the authentication server through the wireless AP in response to the authentication request. In some embodiments, a tenant database (DB) is searched by the authentication server for a tenant corresponding to the certificate. In some embodiments, when the tenant corresponding to the certificate matches a tenant of the wireless AP that the wireless sensor is connected to, the authentication request is accepted by the authentication server, and the authentication response includes an authentication acceptance response. In some embodiments, when the tenant corresponding to the certificate is different from a tenant of the wireless AP that the wireless sensor is connected to, the authentication server sends an EAP notification in a RADIUS response. In some embodiments, at the wireless sensor, an identifier of a tenant that the wireless sensor belongs to is extracted from the EAP notification and the identifier is written into a non-volatile storage. In some embodiments, at the wireless sensor, the wireless sensor is only associated with a second wireless AP that advertises the identifier in a beacon. The authentication steps can take place on multiple different servers in the cloud. In some embodiments, the authentication server includes one or more computing devices. In some embodiments, the authentication server includes one or more servers deployed remotely to the customer site. In some embodiments, the certificate is stored in a secured storage of the wireless sensor. In some embodiments, the secured storage of the wireless sensor includes a Trusted Platform Module (TPM) of the wireless sensor. In some embodiments, the secured storage of the wireless sensor includes a hardware security module (HSM) of the wireless sensor. In some embodiments, the wireless sensor is plugged in a power outlet at the customer site for monitoring a health of a wireless service, where the wireless sensor does not have a user interface. In some embodiments, the certificate includes a sensor serial number of the wireless sensor. In some embodiments, the wireless sensor is used to periodically probe a wireless network to which the wireless AP belongs to exercise different network services. In some embodiments, the authentication request includes an Extensible Authentication Protocol (EAP) message. In some embodiments, at a head end (HE) connected between the wireless AP and the authentication server, a payload is extracted from the authentication request and the payload is encapsulated into a Remote Authentication Dial-In User Service (RADIUS) message that is transmitted to the authentication server. In some embodiments, the authentication server is deployed remotely to the customer site. The wireless sensor may be similar to, the same as, or a component of the network devices 104-1, . . . , 104-N depicted in FIG. 1, the network device 204 depicted in FIG. 2, the wireless sensors 462-1, 462-2 depicted in FIGS. 4 and 5, the wireless sensor 662 depicted in FIG. 6, and/or the wireless sensor 762 depicted in FIG. 7. The wireless AP may be similar to, the same as, or a component of the network devices 104-1, . . . , 104-N depicted in FIG. 1, the network device 204 depicted in FIG. 2, the wireless APs 460-1, 460-2 depicted in FIGS. 4 and 5, the wireless AP 660 depicted in FIG. 6, and/or the wireless AP 760 depicted in FIG. 7. The authentication server may be similar to, the same as, or a component of the cloud server 102 depicted in FIG. 1, the authentication server 402 depicted in FIGS. 4 and 5, the authentication server 602 depicted in FIG. 6, and/or the authentication server 702 depicted in FIG. 7. The customer site may be similar to, the same as, or a component of the customer site 114 depicted in FIG. 1.

Figure 9:
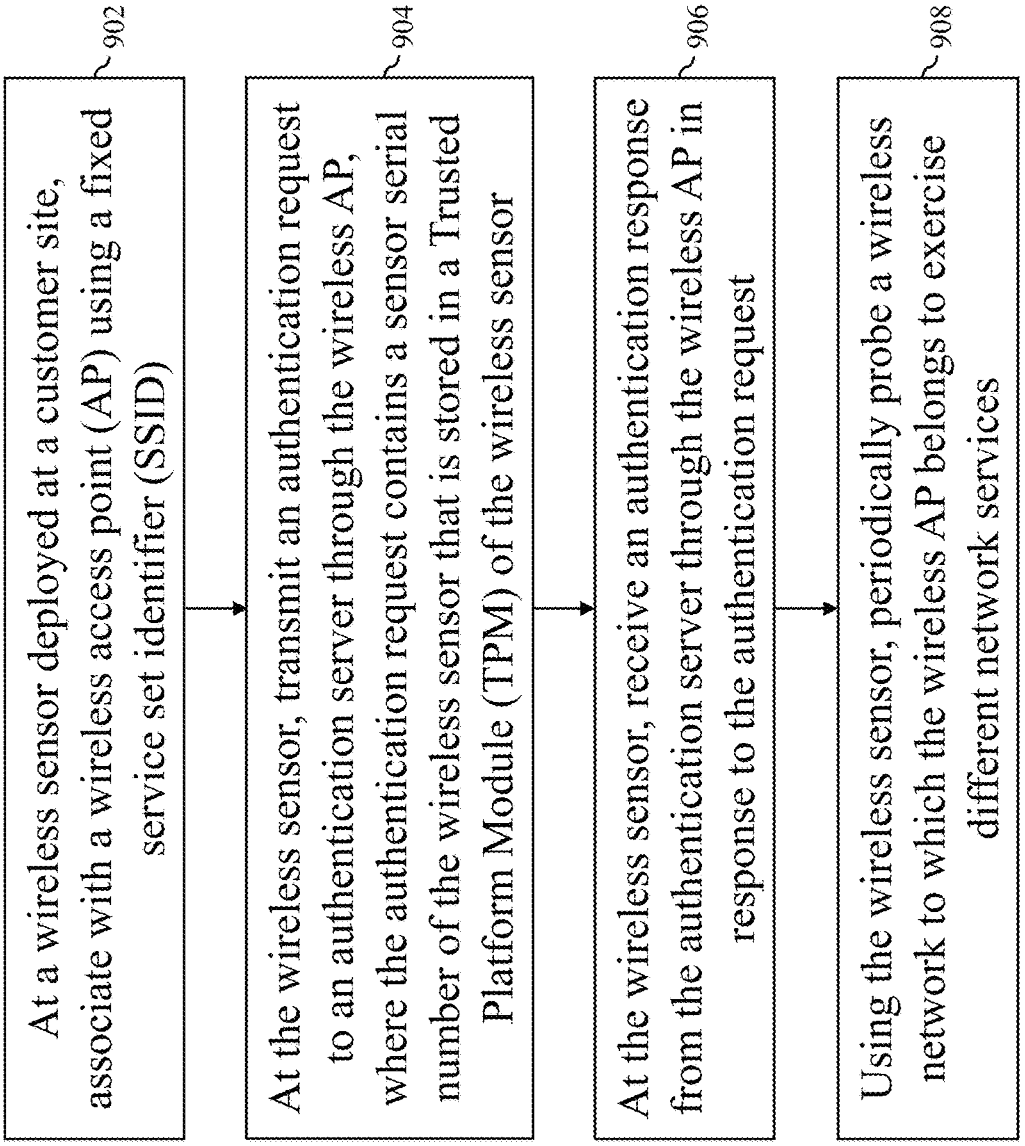
FIG. 9 is a process flow diagram of a method of communications in accordance to an embodiment of the invention.

FIG. 9 is a process flow diagram of a method of communications in accordance to an embodiment of the invention. According to the method, at block 902, at a wireless sensor deployed at a customer site, the wireless sensor is associated with a wireless access point (AP) using a fixed service set identifier (SSID). At block 904, at the wireless sensor, an authentication request is transmitted to an authentication server through the wireless AP, where the authentication request contains a sensor serial number of the wireless sensor that is stored in a Trusted Platform Module (TPM) of the wireless sensor. At block 906, at the wireless sensor, an authentication response is received from the authentication server through the wireless AP in response to the authentication request. At block 908, the wireless sensor is used to periodically probe a wireless network to which the wireless AP belongs to exercise different network services. The authentication steps can take place on multiple different servers in the cloud. In some embodiments, the authentication server includes one or more computing devices. In some embodiments, the authentication server includes one or more servers deployed remotely to the customer site. The wireless sensor may be similar to, the same as, or a component of the network devices 104-1, . . . , 104-N depicted in FIG. 1, the network device 204 depicted in FIG. 2, the wireless sensors 462-1, 462-2 depicted in FIGS. 4 and 5, the wireless sensor 662 depicted in FIG. 6, and/or the wireless sensor 762 depicted in FIG. 7. The wireless AP may be similar to, the same as, or a component of the network devices 104-1, . . . , 104-N depicted in FIG. 1, the network device 204 depicted in FIG. 2, the wireless APs 460-1, 460-2 depicted in FIGS. 4 and 5, the wireless AP 660 depicted in FIG. 6, and/or the wireless AP 760 depicted in FIG. 7. The authentication server may be similar to, the same as, or a component of the cloud server 102 depicted in FIG. 1, the authentication server 402 depicted in FIGS. 4 and 5, the authentication server 602 depicted in FIG. 6, and/or the authentication server 702 depicted in FIG. 7. The customer site may be similar to, the same as, or a component of the customer site 114 depicted in FIG. 1.

Figure 10:
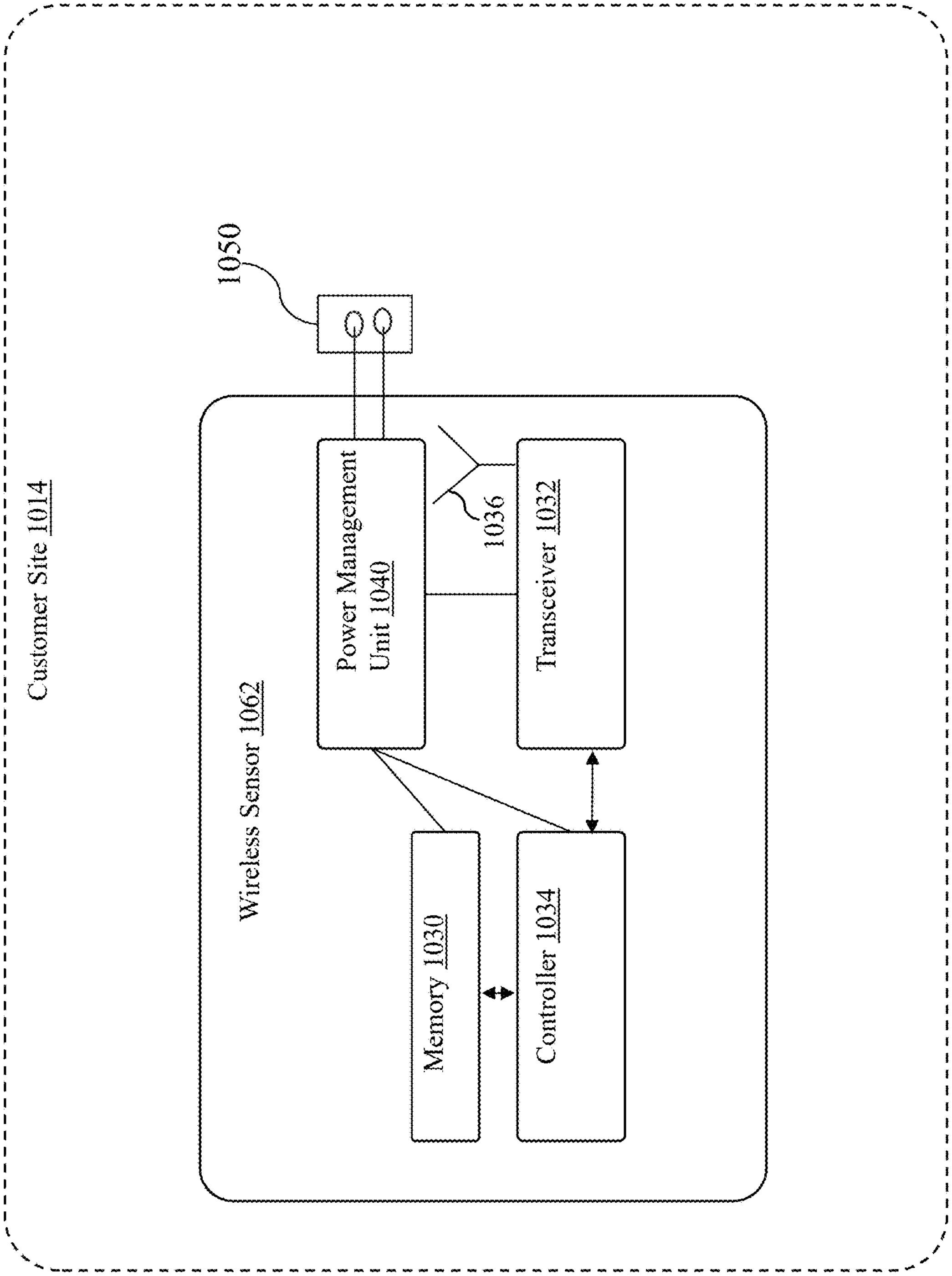
FIG. 10 depicts an embodiment of a wireless sensor deployed at a customer site.

FIG. 10 depicts an embodiment of a wireless sensor 1062 deployed at a customer site 1014. In the embodiment depicted in FIG. 10, the wireless sensor 1062 includes a wireless transceiver 1032, a controller 1034 operably connected to the transceiver 102, at least one antenna 1036 operably connected to the transceiver 1032, and a power management unit 1040 operably connected to the wireless transceiver 1032, the controller 1034, and the antenna 1036. In some embodiments, the wireless transceiver 1032 includes a physical layer (PHY) device. The wireless transceiver 1032 may be any suitable type of transceiver. For example, the wireless transceiver 1032 may be a short-range communications transceiver (e.g., a Bluetooth) or a WLAN transceiver (e.g., a transceiver compatible with an IEEE 802.11 protocol). In some embodiments, the wireless sensor 1062 includes multiple transceivers, for example, a short-range communications transceiver (e.g., a Bluetooth) and a WLAN transceiver (e.g., a transceiver compatible with an IEEE 802.11 protocol). In some embodiments, the controller 1034 is configured to control the transceiver 1032 to process packets received through the antenna 1036 and/or to generate outgoing packets to be transmitted through the antenna 1036. In some embodiments, the controller 1034 is configured to perform an authentication function for the wireless sensor 1062. The antenna 1036 may be any suitable type of antenna. For example, the antenna 1036 may be an induction type antenna such as a loop antenna or any other suitable type of induction type antenna. However, the antenna 1036 is not limited to an induction type antenna. In some embodiments, the wireless sensor 1062 includes memory 1030, which may be a standalone unit or embedded into another component (e.g., the controller 1034) of the wireless sensor 1062. In some embodiments, the memory is volatile memory used for retrieving programs and processing data. The memory may include, for example, one or more random access memory (RAM) modules. In some embodiments, the power management unit 1040 includes a power adapter unit configured to convert input alternate current (AC) power with a higher voltage (110-240 volts) from a wall socket or power outlet to a lower direct current (DC) voltage (e.g., below 10 volts). Although the illustrated wireless sensor 1062 is shown with certain components and described with certain functionality herein, other embodiments of the wireless sensor 1062 may include fewer or more components to implement the same, less, or more functionality. In another example, although the components of the wireless sensor 1062 are shown in FIG. 10 as being connected in certain topology, the network topology of the wireless sensor 1062 is not limited to the topology shown in FIG. 10.

In the embodiment depicted in FIG. 10, the wireless sensor 1062 is plugged into a wall socket or power outlet 1050 to receive alternate current (AC) Power and has little or no user interface. The wireless sensor 1062 may be a dedicated device for monitoring quality and/or signal strength, etc. of wireless (e.g., WiFi) signals that is being received by the wireless sensor 1062. The wireless sensor 1062 generally does not provide WiFi access to other devices and is not for personal use. Wireless sensors, such as the wireless sensor 1062, can be strategically placed throughout the customer site 1014 to continuously collect and transmit RF data of Dynamic Host Configuration Protocol (DHCP), RADIUS, Internet, Domain Name System (DNS), and applications. The collected data can be sent to a cloud server (e.g., the cloud server 102 depicted in FIG. 1) for real-time analysis to identify any issues that can cause end-to-end service interruptions within a wireless network. The wireless sensor 1062 can be used to monitor coverage, capacity, and availability for local area network (LAN) connectivity. For example, after plugging wireless sensors strategically plugged into wall power outlets throughout a building where wireless is deployed, an installer can activate the wireless sensors using a mobile application, making deployment easy with no customer setup or configuration required. In some embodiments, the wireless sensor 1062 starts up automatically upon plug in or has an on/off switch that can be toggled by an installer to enable the wireless sensor 1062. The wireless sensor 1062 can be programmed to identify and connect to a correct tenant or customer's APs. In some embodiments, the wireless sensor 1062 is designed for tamper-proof operation and comes preinstalled with a Trusted Platform Module (TPM) certificate for secure device identification and IEEE 802.1X authentication.

In some embodiments, the controller 1034 is configured to associate with a wireless access point (AP) using a fixed service set identifier (SSID) and the wireless transceiver 1032 is configured to transmit an authentication request to an authentication server through the wireless AP and to receive an authentication response from the authentication server through the wireless AP in response to the authentication request, where the authentication request contains a certificate that is stored in the wireless sensor 1062. In some embodiments, a tenant database (DB) is searched by the authentication server for a tenant corresponding to the certificate. In some embodiments, when the tenant corresponding to the certificate matches a tenant of the wireless AP that the wireless sensor 1062 is connected to, the authentication request is accepted by the authentication server, and the authentication response includes an authentication acceptance response. In some embodiments, when the tenant corresponding to the certificate is different from a tenant of the wireless AP that the wireless sensor 1062 is connected to, the authentication request is rejected by the authentication server, and the authentication response includes an EAP notification response. In some embodiments, the controller 1034 is further configured to extract an identifier of a tenant that the wireless sensor 1062 belongs to from the EAP notification response and to write the identifier into a non-volatile storage. In some embodiments, the controller 1034 is further configured to only associate with a second wireless AP that advertises the identifier in a beacon. In some embodiments, the certificate is stored in a secured storage of the wireless sensor 1062. In some embodiments, the secured storage of the wireless sensor 1062 includes a Trusted Platform Module (TPM) of the wireless sensor 1062. In some embodiments, the secured storage of the wireless sensor 1062 includes a hardware security module (HSM) of the wireless sensor 1062. In some embodiments, the wireless sensor 1062 is a wireless sensor that is plugged in a power outlet or socket 1050 at the customer site for monitoring a health of a wireless service, where the wireless sensor does not have a user interface. In some embodiments, the certificate includes a sensor serial number of the wireless sensor. In some embodiments, the wireless sensor is used to periodically probe a wireless network to which the wireless AP belongs to implement different network services. In some embodiments, the authentication request includes an Extensible Authentication Protocol (EAP) message. In some embodiments, at a head end (HE) connected between the wireless AP and the authentication server, a payload is extracted from the authentication request and the payload is encapsulated into a Remote Authentication Dial-In User Service (RADIUS) message that is transmitted to the authentication server. In some embodiments, the authentication server is deployed remotely to the customer site.

Figure 11:
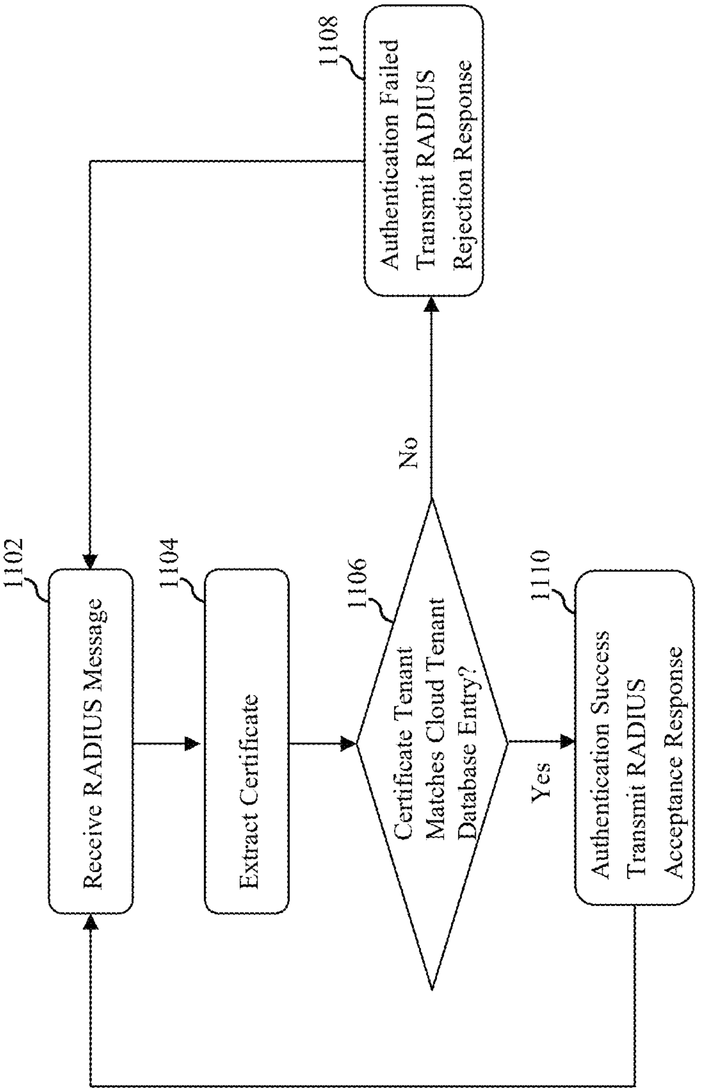
FIG. 11 is a flow chart that illustrates an example authentication operation that can be performed by a cloud authentication server.

FIG. 11 is a flow chart that illustrates an example authentication operation that can be performed by a cloud authentication server. In the example authentication operation, an authentication algorithm is implemented to authenticate one or more wireless sensors (e.g., the network devices 104-1, . . . , 104-N depicted in FIG. 1, the network device 204 depicted in FIG. 2, the wireless sensors 462-1, 462-2 depicted in FIGS. 4 and 5, the wireless sensor 662 depicted in FIG. 6, the wireless sensor 762 depicted in FIG. 7, and/or the wireless sensor 1062 depicted in FIG. 10) and is executable by, for example, one or more processors of a cloud authentication server (e.g., the cloud server 102 depicted in FIG. 1, the authentication server 402 depicted in FIGS. 4 and 5, the authentication server 602 depicted in FIG. 6, and/or the authentication server 702 depicted in FIG. 7). At step 1102, a RADIUS message from a wireless sensor is received at the cloud authentication server, for example, through a HE. At step 1104, a certificate is extracted from the RADIUS message at the cloud authentication server. At step 1106, a determination regarding whether the tenant corresponding to the certificate in a database entry of a cloud tenant database (DB) matches the tenant of the wireless AP that the wireless sensor is connected to is made, for example, by the cloud authentication server. For example, the cloud authentication server can query the cloud tenant DB to find an entry having the certificate of the wireless sensor. If/when the cloud authentication server determines that the tenant corresponding to the certificate in a database entry of a cloud tenant database (DB) does not match (i.e., is not the same as) the tenant of the wireless AP that the wireless sensor is connected to, the cloud authentication server determines that the authentication for the wireless sensor has failed and transmits an EAP notification containing the desired tenant identifier for the sensor. The EAP notification response is sent inside a RADIUS response back to the headend. The headend extracts the EAP notification and sends it to the wireless sensor through the wireless AP at step 1108 and the operation goes back to step 1102 for a subsequent wireless sensor authentication. In some embodiments, the EAP notification response contains an identifier of a tenant that the wireless sensor belongs to and the wireless sensor extracts the identifier of the tenant that the wireless sensor belongs to from the authentication response and writes the identifier into a non-volatile storage. The wireless sensor may only associate with a wireless AP that advertises the identifier in a beacon. If/when the cloud authentication server determines that the tenant corresponding to the certificate in a database entry of a cloud tenant database (DB) matches (i.e., is the same as) the tenant of the wireless AP that the wireless sensor is connected to, the cloud authentication server determines that the authentication for the wireless sensor has been successfully completed and transmits a RADIUS acceptance response back to the wireless sensor through the wireless AP at step 1110 and the operation goes back to step 1102 for a subsequent wireless sensor authentication. The authentication steps can take place on multiple different servers in the cloud. In some embodiments, the cloud authentication server includes one or more computing devices. In some embodiments, the cloud authentication server includes one or more servers deployed remotely to the customer site.

Figure 12:
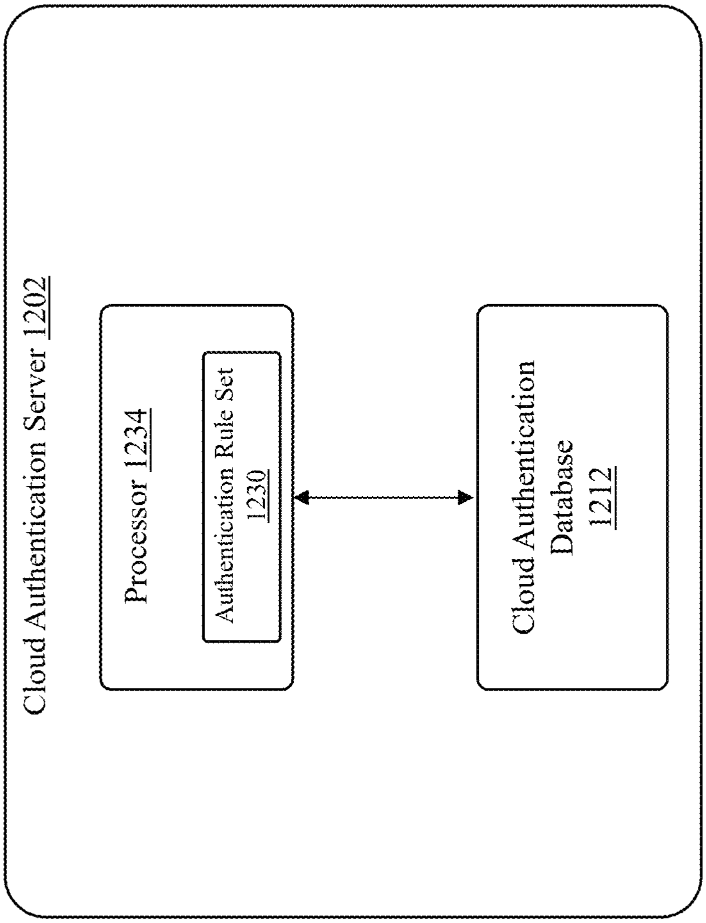
FIG. 12 depicts an embodiment of a cloud authentication server.

FIG. 12 depicts an embodiment of a cloud authentication server 1202. In the embodiment depicted in FIG. 12, the cloud authentication server 1202 includes a cloud authentication database (DB) 1212 configured to store database entries and at least one processor 1234 configured to receive an authentication request of a wireless sensor deployed at a customer site through a wireless access point (AP) to which the wireless sensor is associated, where the authentication request contains a certificate that is stored in the wireless sensor, perform an authentication operation to determine whether a tenant corresponding to the certificate matches a tenant corresponding to the wireless AP to which the wireless sensor is associated by searching the database entries of the cloud tenant DB, and generate an authentication response to the wireless sensor in response to the authentication operation. In some embodiments, the at least one processor 1234 is configured to facilitate or perform an authentication service to wireless sensors at a customer site, for example, using an authentication rule set 1230. The authentication rule set 1230 may include one or more authentication rules for network devices at the customer site, for example, for performing an authentication service to wireless sensors at the customer site 114. In some embodiments, the authentication database 1212 is configured to store authentication data for a network deployed and/or to be deployed at the customer site (e.g., a list of network devices deployed or to be deployed at the customer site). In some embodiments, the at least one processor 1234 includes at least one microcontroller, at least one digital signal processor (DSP), and/or at least one central processing unit (CPU). In some embodiments, the at least one processor 1234 is further configured to accept the authentication request when the tenant corresponding to the certificate matches the tenant of the wireless AP that the wireless sensor is connected to, and where the authentication response includes an authentication acceptance response. In some embodiments, the at least one processor 1234 is further configured to reject the authentication request when the tenant corresponding to the certificate is different from the tenant of the wireless AP that the wireless sensor is connected to, and where the authentication response includes an EAP notification response. In some embodiments, the at least one processor 1234 is further configured to search the cloud authentication database (DB) for a database entry that includes the tenant corresponding to the certificate. In some embodiments, the EAP notification response includes an identifier of a tenant that the wireless sensor belongs to, and at the wireless sensor, the identifier of the tenant that the wireless sensor belongs to is extracted from the authentication response and written into a non-volatile storage of the wireless sensor. In some embodiments, the wireless sensor is only associated with a second wireless AP that advertises the identifier in a beacon. In some embodiments, the wireless AP has a service set identifier (SSID) known to the wireless sensor. In some embodiments, the certificate is stored in a secured storage of the wireless sensor. In some embodiments, the secured storage of the wireless sensor includes a Trusted Platform Module (TPM) of the wireless sensor. In some embodiments, the secured storage of the wireless sensor includes a hardware security module (HSM) of the wireless sensor. The authentication steps can take place on multiple different servers in the cloud. In some embodiments, the cloud authentication server includes one or more computing devices. In some embodiments, the cloud authentication server includes one or more servers deployed remotely to the customer site. In some embodiments, the certificate includes a sensor serial number of the wireless sensor. In some embodiments, the wireless sensor is plugged in a power outlet at the customer site for monitoring a health of a wireless service, where the wireless sensor does not have a user interface. In some embodiments, the wireless sensor is used to periodically probe a wireless network to which the wireless AP belongs to implement different network services. In some embodiments, the authentication request includes an Extensible Authentication Protocol (EAP) message. In some embodiments, at a head end (HE) connected between the wireless AP and the cloud authentication server, a payload is extracted from the authentication request and the payload is encapsulated into a Remote Authentication Dial-In User Service (RADIUS) message that is transmitted to the cloud authentication server. In some embodiments, the cloud authentication server is deployed remotely to the customer site. The cloud authentication database (DB) 1212 depicted in FIG. 12 is an embodiment of the deployment database 112 depicted in FIG. 1. However, the deployment database 112 depicted in FIG. 1 is not limited to the embodiment shown in FIG. 12.

Figure 13:
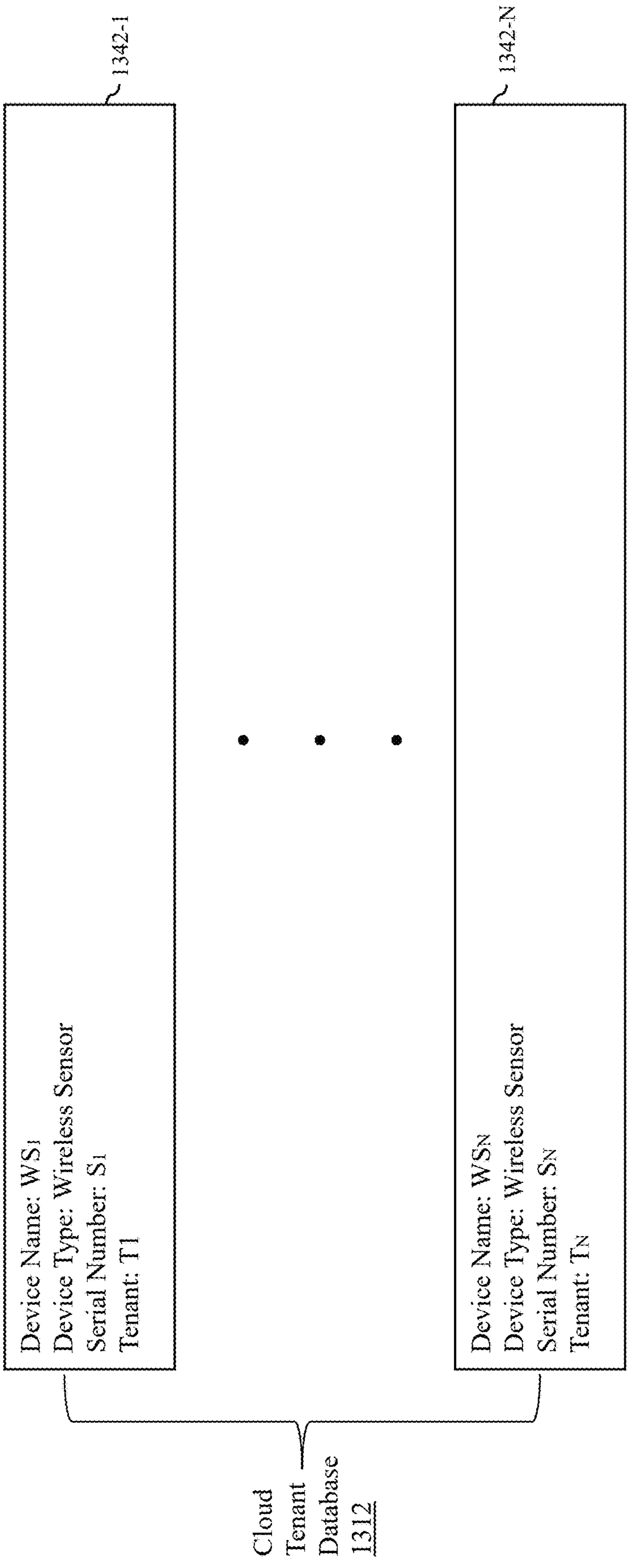
FIG. 13 depicts an embodiment of a cloud tenant database (DB) of a cloud authentication server.

FIG. 13 depicts an embodiment of a cloud tenant database (DB) 1312 of a cloud authentication server. The cloud tenant database (DB) 1312 depicted in FIG. 13 is an embodiment of the cloud authentication database (DB) 1212 depicted in FIG. 12. However, the cloud authentication database (DB) 1212 depicted in FIG. 12 is not limited to the embodiment shown in FIG. 13. In the embodiment depicted in FIG. 13, the cloud tenant database 1312 includes multiple database entries 1342-1, . . . , 1342-N, where N is an integer greater than 1. Each of the database entries 132-1, . . . , 1342-N includes device name information of a wireless sensor to be deployed at a customer site, device type information, device certificate (e.g., serial number) information of the wireless sensor, and tenant information of the wireless sensor. In some embodiments, each database entry also includes a location tag or item, which is set to blank because a corresponding wireless sensor is not deployed to a customer site yet. For example, the database entry 1342-1 includes device name information ($WS_1$) of a wireless sensor to be deployed at a customer site, device type information (e.g., wireless sensor) of the wireless sensor, device serial number information ($S_1$) of the wireless sensor, and the tenant to which the wireless sensor belongs ($T_1$), while the database entry 1342-N includes device name information ($WS_N$) of a wireless sensor to be deployed at a customer site, device type information (e.g., wireless sensor) of the wireless sensor, device serial number information ($S_N$) of the wireless sensor, and the tenant to which the wireless sensor belongs ($T_N$).

Figure 14:
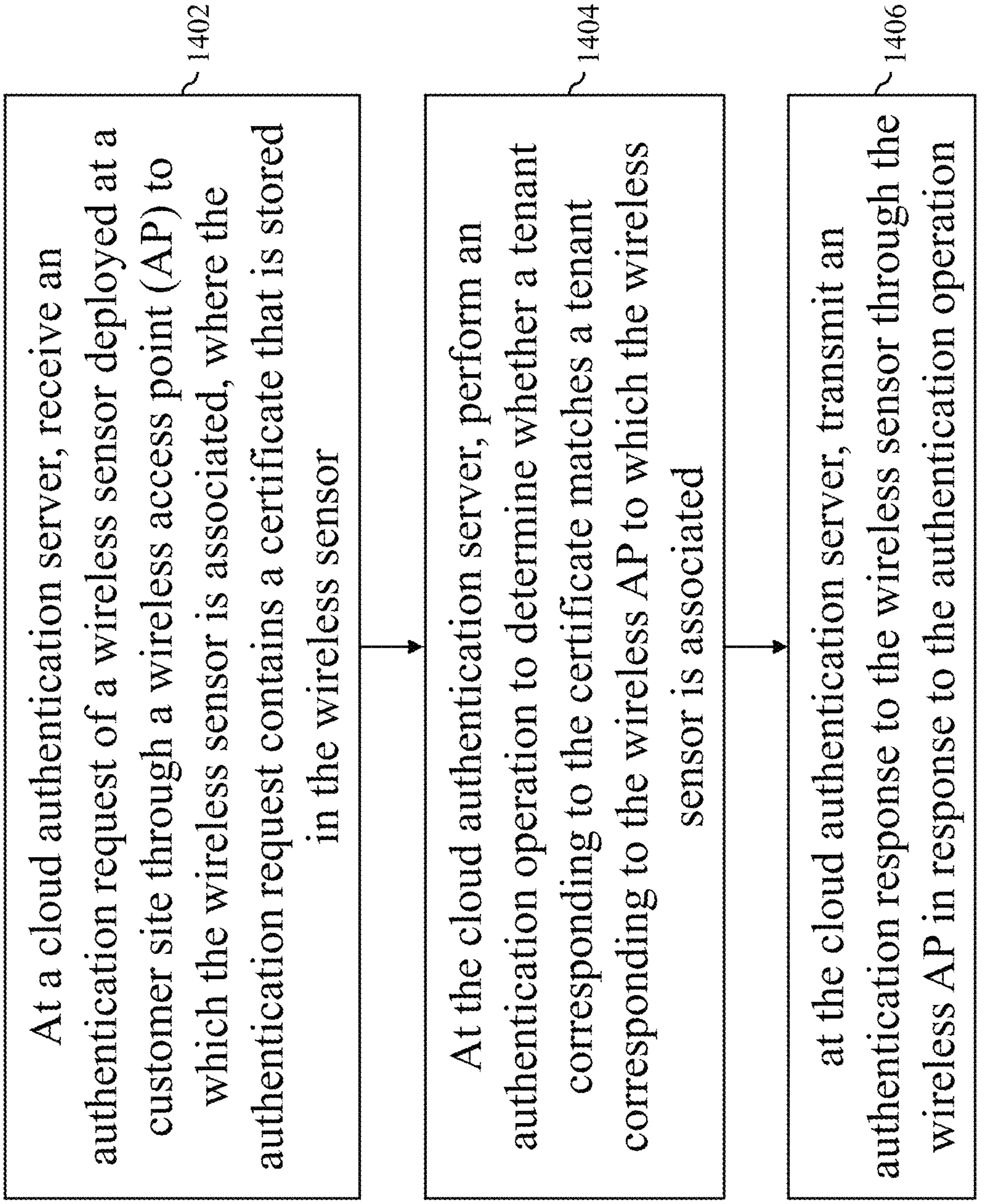
FIG. 14 is a process flow diagram of a method of communications in accordance to an embodiment of the invention.

FIG. 14 is a process flow diagram of a method of communications in accordance to an embodiment of the invention. According to the method, at block 1402, at a cloud authentication server, an authentication request of a wireless sensor deployed at a customer site is received through a wireless access point (AP) to which the wireless sensor is associated, where the authentication request contains a certificate that is stored in the wireless sensor. At block 1404, at the cloud authentication server, an authentication operation is performed to determine whether a tenant corresponding to the certificate matches a tenant corresponding to the wireless AP to which the wireless sensor is associated. At block 1406, at the cloud authentication server, an authentication response to the wireless sensor is transmitted through the wireless AP in response to the authentication operation. In some embodiments, at the cloud authentication server, a cloud authentication database (DB) is searched for a database entry that includes the tenant corresponding to the certificate. In some embodiments, at the cloud authentication server, the authentication request is accepted when the tenant corresponding to the certificate matches the tenant of the wireless AP that the wireless sensor is connected to, and where the authentication response includes an authentication acceptance response. In some embodiments, at the cloud authentication server, the authentication request is rejected when the tenant corresponding to the certificate is different from the tenant of the wireless AP that the wireless sensor is connected to, and the authentication response includes an EAP notification response. In some embodiments, the EAP notification response includes an identifier of a tenant that the wireless sensor belongs to, and at the wireless sensor, the identifier of the tenant that the wireless sensor belongs to is extracted from the authentication response and written into a non-volatile storage of the wireless sensor. In some embodiments, the wireless sensor is only associated with a second wireless AP that advertises the identifier in a beacon. In some embodiments, the wireless AP has a service set identifier (SSID) known to the wireless sensor. In some embodiments, the certificate is stored in a secured storage of the wireless sensor. In some embodiments, the secured storage of the wireless sensor includes a Trusted Platform Module (TPM) of the wireless sensor. In some embodiments, the secured storage of the wireless sensor includes a hardware security module (HSM) of the wireless sensor. The authentication steps can take place on multiple different servers in the cloud. In some embodiments, the cloud authentication server includes one or more computing devices. In some embodiments, the cloud authentication server includes one or more servers deployed remotely to the customer site. In some embodiments, the certificate includes a sensor serial number of the wireless sensor. In some embodiments, the wireless sensor is plugged in a power outlet at the customer site for monitoring a health of a wireless service, the wireless sensor does not have a user interface. In some embodiments, using the wireless sensor, a wireless network to which the wireless AP belongs is periodically probed to implement different network services. In some embodiments, the authentication request includes an Extensible Authentication Protocol (EAP) message. In some embodiments, at a head end (HE) connected between the wireless AP and the cloud authentication server, a payload is extracted from the authentication request and the payload is encapsulated into a Remote Authentication Dial-In User Service (RADIUS) message that is transmitted to the cloud authentication server. In some embodiments, the cloud authentication server is deployed remotely to the customer site. The wireless sensor may be similar to, the same as, or a component of the network devices 104-1, . . . , 104-N depicted in FIG. 1, the network device 204 depicted in FIG. 2, the wireless sensors 462-1, 462-2 depicted in FIGS. 4 and 5, the wireless sensor 662 depicted in FIG. 6, the wireless sensor 762 depicted in FIG. 7, and/or the wireless sensor 1062 depicted in FIG. 10. The wireless AP may be similar to, the same as, or a component of the network devices 104-1, . . . , 104-N depicted in FIG. 1, the network device 204 depicted in FIG. 2, the wireless APs 460-1, 460-2 depicted in FIGS. 4 and 5, the wireless AP 660 depicted in FIG. 6, and/or the wireless AP 760 depicted in FIG. 7. The authentication server may be similar to, the same as, or a component of the cloud server 102 depicted in FIG. 1, the authentication server 402 depicted in FIGS. 4 and 5, the authentication server 602 depicted in FIG. 6, the authentication server 702 depicted in FIG. 7, and/or the cloud authentication server 1202 depicted in FIG. 12. The customer site may be similar to, the same as, or a component of the customer site 114 depicted in FIG. 1.

Figure 15:
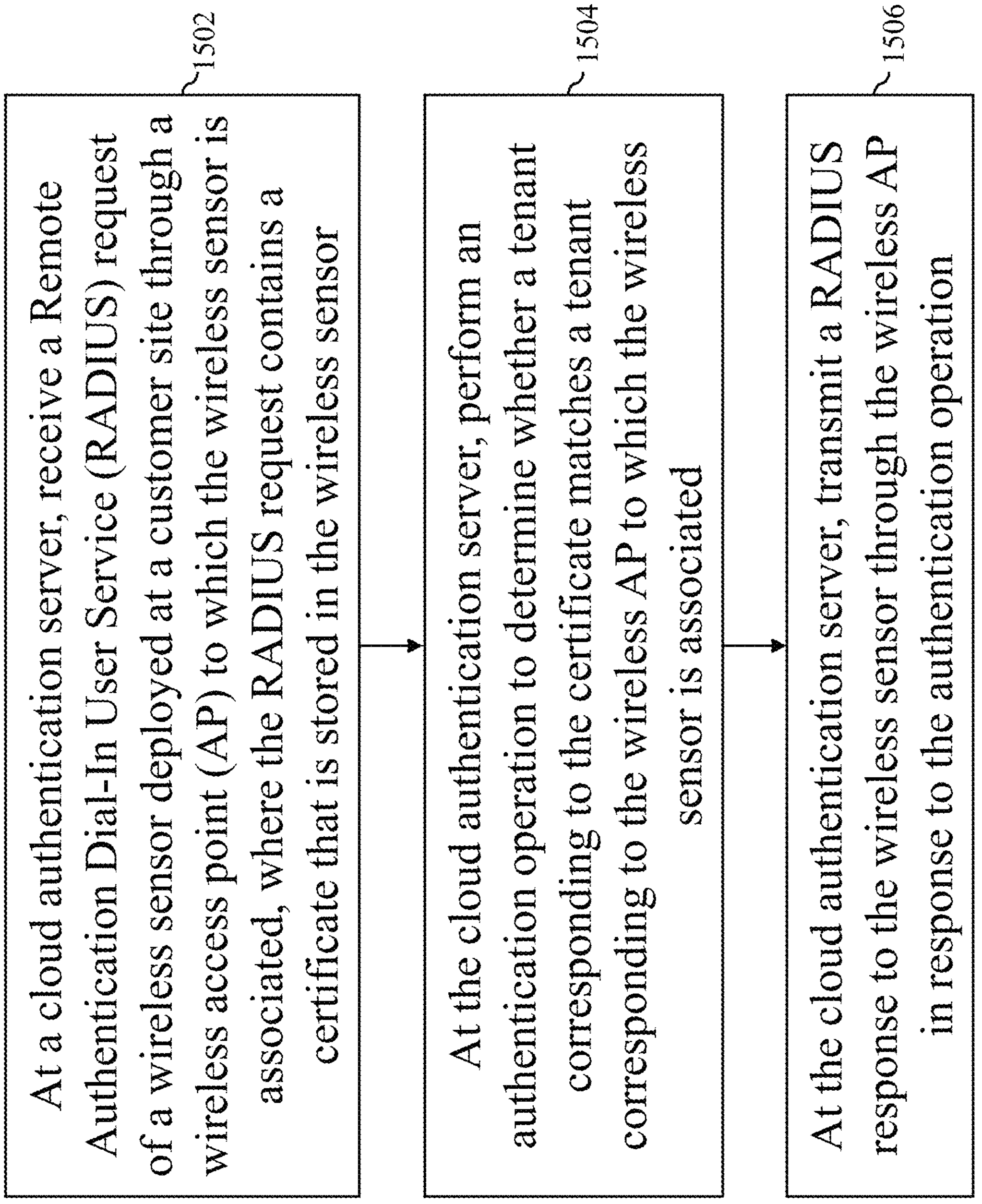
FIG. 15 is a process flow diagram of a method of communications in accordance to an embodiment of the invention.

FIG. 15 is a process flow diagram of a method of communications in accordance to an embodiment of the invention. According to the method, at block 1502, at a cloud authentication server, a Remote Authentication Dial-In User Service (RADIUS) request of a wireless sensor deployed at a customer site is received through a wireless access point (AP) to which the wireless sensor is associated, where the RADIUS request contains a certificate that is stored in the wireless sensor. At block 1504, at the cloud authentication server, an authentication operation is performed to determine whether a tenant corresponding to the certificate matches a tenant corresponding to the wireless AP to which the wireless sensor is associated. At block 1506, at the cloud authentication server, a RADIUS response is transmitted to the wireless sensor through the wireless AP in response to the authentication operation. The authentication steps can take place on multiple different servers in the cloud. In some embodiments, the cloud authentication server includes one or more computing devices. In some embodiments, the cloud authentication server includes one or more servers deployed remotely to the customer site. The wireless sensor may be similar to, the same as, or a component of the network devices 104-1, . . . , 104-N depicted in FIG. 1, the network device 204 depicted in FIG. 2, the wireless sensors 462-1, 462-2 depicted in FIGS. 4 and 5, the wireless sensor 662 depicted in FIG. 6, the wireless sensor 762 depicted in FIG. 7, and/or the wireless sensor 1062 depicted in FIG. 10. The wireless AP may be similar to, the same as, or a component of the network devices 104-1, . . . , 104-N depicted in FIG. 1, the network device 204 depicted in FIG. 2, the wireless APs 460-1, 460-2 depicted in FIGS. 4 and 5, the wireless AP 660 depicted in FIG. 6, and/or the wireless AP 760 depicted in FIG. 7. The authentication server may be similar to, the same as, or a component of the cloud server 102 depicted in FIG. 1, the authentication server 402 depicted in FIGS. 4 and 5, the authentication server 602 depicted in FIG. 6, the authentication server 702 depicted in FIG. 7, and/or the cloud authentication server 1202 depicted in FIG. 12. The customer site may be similar to, the same as, or a component of the customer site 114 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of communications, the method comprising:

at a cloud authentication server, receiving an authentication request of a wireless sensor deployed at a customer site through a wireless access point (AP) to which the wireless sensor is associated, wherein the authentication request contains a certificate that is stored in the wireless sensor;

at the cloud authentication server, performing an authentication operation to determine whether a tenant corresponding to the certificate matches a tenant corresponding to the wireless AP to which the wireless sensor is associated; and at the cloud authentication server, transmitting an authentication response to the wireless sensor through the wireless AP in response to the authentication operation.

2. The method of claim 1, wherein at the cloud authentication server, performing the authentication operation comprises at the cloud authentication server, searching a cloud authentication database (DB) for a database entry that comprises the tenant corresponding to the certificate.

3. The method of claim 2, wherein at the cloud authentication server, performing the authentication operation further comprises at the cloud authentication server, accepting the authentication request when the tenant corresponding to the certificate matches the tenant of the wireless AP that the wireless sensor is connected to, and wherein the authentication response comprises an authentication acceptance response.

4. The method of claim 2, wherein at the cloud authentication server, performing the authentication operation further comprises at the cloud authentication server, rejecting the authentication request when the tenant corresponding to the certificate is different from the tenant of the wireless AP that the wireless sensor is connected to, and wherein the authentication response comprises an Extensible Authentication Protocol (EAP) notification response.

5. The method of claim 4, wherein the authentication rejection response comprises an identifier of a tenant that the wireless sensor belongs to, and wherein at the wireless sensor, the identifier of the tenant that the wireless sensor belongs to is extracted from the EAP notification response and written into a non-volatile storage of the wireless sensor.

6. The method of claim 5, further comprising at the wireless sensor, only associating with a second wireless AP that advertises the identifier in a beacon.

7. The method of claim 1, wherein the wireless AP has a service set identifier (SSID) known to the wireless sensor.

8. The method of claim 1, wherein the certificate is stored in a secured storage of the wireless sensor.

9. The method of claim 1, wherein the cloud authentication server comprises one or more computing devices.

10. The method of claim 1, wherein the cloud authentication server comprises one or more servers deployed remotely to the customer site.

11. The method of claim 8, wherein the certificate comprises a sensor serial number of the wireless sensor.

12. The method of claim 1, wherein the wireless sensor is plugged in a power outlet at the customer site for monitoring a health of a wireless service, and wherein the wireless sensor does not have a user interface.

13. The method of claim 12, further comprising using the wireless sensor, periodically probing a wireless network to which the wireless AP belongs to implement different network services.

14. The method of claim 1, wherein the authentication request comprises an Extensible Authentication Protocol (EAP) message.

15. The method of claim 1, wherein at a head end (HE) connected between the wireless AP and the cloud authentication server, a payload is extracted from the authentication request and the payload is encapsulated into a Remote Authentication Dial-In User Service (RADIUS) message that is transmitted to the cloud authentication server.

16. The method of claim 1, wherein the cloud authentication server is deployed remotely to the customer site.

17. A cloud authentication server comprising:

a cloud authentication database (DB) configured to store a plurality of database entries; and one or more processors configured to:

receive an authentication request of a wireless sensor deployed at a customer site through a wireless access point (AP) to which the wireless sensor is associated, wherein the authentication request contains a certificate that is stored in the wireless sensor;

perform an authentication operation to determine whether a tenant corresponding to the certificate matches a tenant corresponding to the wireless AP to which the wireless sensor is associated by searching the database entries of the cloud authentication DB; and generating an authentication response to the wireless sensor in response to the authentication operation.

18. The cloud authentication server of claim 17, wherein the one or more processors are further configured to accept the authentication request when the tenant corresponding to the certificate matches the tenant of the wireless AP that the wireless sensor is connected to, and wherein the authentication response comprises an authentication acceptance response.

19. The cloud authentication server of claim 17, wherein the one or more processors are further configured to reject the authentication request when the tenant corresponding to the certificate is different from the tenant of the wireless AP that the wireless sensor is connected to, and wherein the authentication response comprises an Extensible Authentication Protocol (EAP) notification response.

20. A method of communications, the method comprising:

at a cloud authentication server, receiving a Remote Authentication Dial-In User Service (RADIUS) request of a wireless sensor deployed at a customer site through a wireless access point (AP) to which the wireless sensor is associated, wherein the RADIUS request contains a certificate that is stored in the wireless sensor;

at the cloud authentication server, performing an authentication operation to determine whether a tenant corresponding to the certificate matches a tenant corresponding to the wireless AP to which the wireless sensor is associated; and at the cloud authentication server, transmitting a RADIUS response to the wireless sensor through the wireless AP in response to the authentication operation.

* * * * *